United States Patent [19]

Hoshino

[11] Patent Number: 5,267,033
[45] Date of Patent: Nov. 30, 1993

[54] HOLLOW BODY INSPECTION SYSTEM, HOLLOW BODY INSPECTION APPARATUS AND SIGNAL TRANSMISSION APPARATUS

[75] Inventor: Masaru Hoshino, Tokyo, Japan

[73] Assignee: Dai Nippon Printing Co., Ltd., Japan

[21] Appl. No.: 800,624

[22] Filed: Nov. 27, 1991

[30] Foreign Application Priority Data

| Nov. 28, 1990 | [JP] | Japan | 2-327175 |
| Nov. 28, 1990 | [JP] | Japan | 2-327176 |
| Nov. 28, 1990 | [JP] | Japan | 2-327177 |
| Mar. 29, 1991 | [JP] | Japan | 3-67212 |
| Mar. 29, 1991 | [JP] | Japan | 3-67213 |
| Mar. 29, 1991 | [JP] | Japan | 3-67214 |
| Mar. 29, 1991 | [JP] | Japan | 3-67215 |
| Mar. 29, 1991 | [JP] | Japan | 3-67216 |
| Mar. 29, 1991 | [JP] | Japan | 3-67221 |
| Aug. 28, 1991 | [JP] | Japan | 3-217085 |

[51] Int. Cl.$^5$ ............................................. H04N 7/18
[52] U.S. Cl. ................................. 358/101; 250/223 B; 358/106; 382/8; 455/95
[58] Field of Search ................. 358/93, 100, 101, 106; 382/8; 250/223 B; 455/95

[56] References Cited

U.S. PATENT DOCUMENTS

| 4,136,930 | 1/1979 | Gomm | 358/106 |
| 4,633,304 | 12/1986 | Nagasaki | 455/95 |
| 4,915,237 | 4/1990 | Chang | 358/106 |

*Primary Examiner*—Howard W. Britton
*Attorney, Agent, or Firm*—Ladas & Parry

[57] ABSTRACT

While carrying and rotating a tubular body to be inspected, an image pick up device is inserted into the tubular body to be inspected to pick up an image of the internal surface thereof to take out a corresponding video signal to transmit the video signal to an image processing device through an antenna device to carry out image processing to judge the internal surface of the tubular body to be inspected. In the antenna device ring-shaped conductors are oppositely arranged in a ring-shaped hollow chamber provided within an electromagnetic shielding body wherein one ring-shaped conductor is rotated and the other is fixed.

13 Claims, 32 Drawing Sheets

F I G. 4
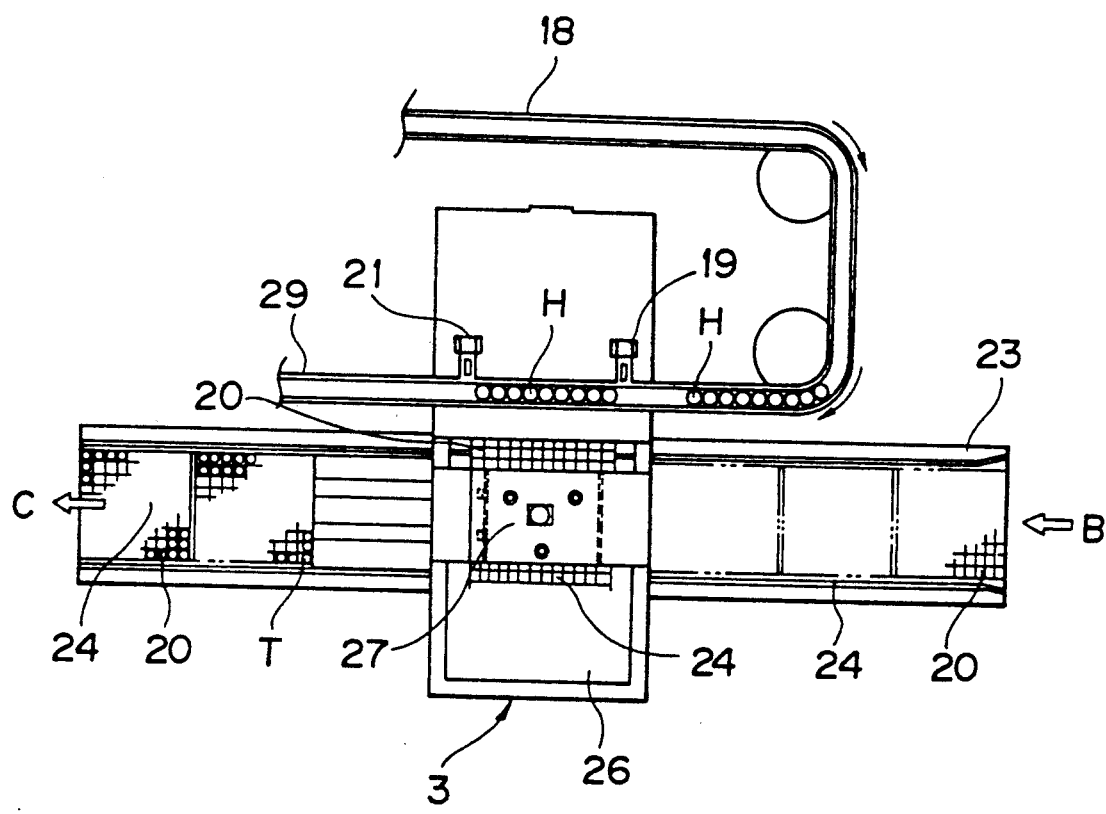

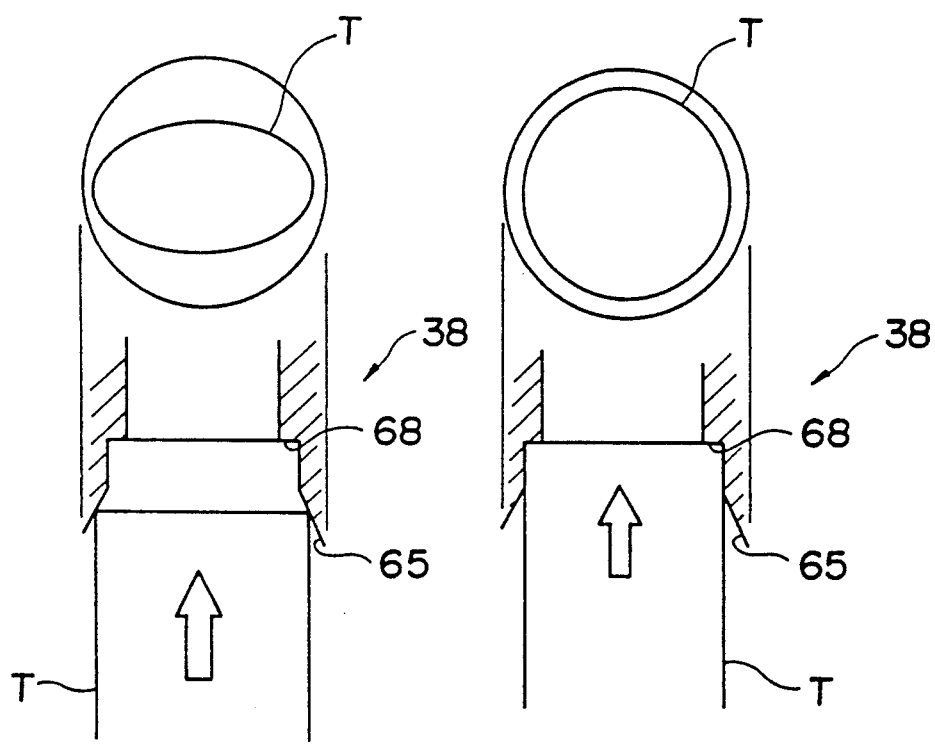

FIG. 24

| ROTARY BLOCK | | | | | | | | | | | | | | FIXED BLOCK | | | | | | | | | | |
|---|---|---|---|---|---|---|---|---|---|---|---|---|---|---|---|---|---|---|---|---|---|---|---|---|
| RESOLVER (ROTATION) | | CAMERA No. | | | | | | | | | | | | RESOLVER (FIXED) | | CHECKER 90A | | | | CHECKER 90B | | | |
| AN-GLE | PAT-TERN | 12 | 11 | 10 | 9 | 8 | 7 | 6 | 5 | 4 | 3 | 2 | 1 | AN-GLE | PAT-TERN | d | c | b | a | d | c | b | a |
| 0 | ① | 1 | 1 | 1 | 0 | 0 | 0 | 0 | 0 | 0 | 0 | 0 | 1 | 0 | A | 1 | 1 | 0 | 0 | 1 | 0 | 0 | 1 |
| 30 | ② | 1 | 1 | 0 | 0 | 0 | 0 | 0 | 0 | 0 | 0 | 1 | 1 | 15 | B | 1 | 1 | 0 | 0 | 0 | 0 | 1 | 1 |
| 60 | ③ | 1 | 0 | 0 | 0 | 0 | 0 | 0 | 0 | 0 | 1 | 1 | 1 | 30 | C | 1 | 0 | 0 | 1 | 0 | 0 | 1 | 1 |
| 90 | ④ | 0 | 0 | 0 | 0 | 0 | 0 | 0 | 0 | 1 | 1 | 1 | 1 | 45 | D | 0 | 0 | 1 | 1 | 0 | 0 | 1 | 1 |
| 120 | ⑤ | 0 | 0 | 0 | 0 | 0 | 0 | 0 | 1 | 1 | 1 | 1 | 0 | 60 | E | 0 | 0 | 1 | 1 | 0 | 1 | 1 | 0 |
| 150 | ⑥ | 0 | 0 | 0 | 0 | 0 | 0 | 1 | 1 | 1 | 1 | 0 | 0 | 75 | F | 0 | 0 | 1 | 1 | 1 | 1 | 0 | 0 |
| 180 | ⑦ | 0 | 0 | 0 | 0 | 0 | 1 | 1 | 1 | 1 | 0 | 0 | 0 | 90 | G | 0 | 1 | 1 | 0 | 1 | 1 | 0 | 0 |
| 210 | ⑧ | 0 | 0 | 0 | 0 | 1 | 1 | 1 | 1 | 0 | 0 | 0 | 0 | 105 | H | 1 | 1 | 0 | 0 | 1 | 1 | 0 | 0 |
| 240 | ⑨ | 0 | 0 | 0 | 1 | 1 | 1 | 1 | 0 | 0 | 0 | 0 | 0 | 120 | A | 1 | 1 | 0 | 0 | 1 | 0 | 0 | 1 |
| 270 | ⑩ | 0 | 0 | 1 | 1 | 1 | 1 | 0 | 0 | 0 | 0 | 0 | 0 | 135 | B | 1 | 1 | 0 | 0 | 0 | 0 | 1 | 1 |
| 300 | ⑪ | 0 | 1 | 1 | 1 | 1 | 0 | 0 | 0 | 0 | 0 | 0 | 0 | 150 | C | 1 | 0 | 0 | 1 | 0 | 0 | 1 | 1 |
| 330 | ⑫ | 1 | 1 | 1 | 1 | 0 | 0 | 0 | 0 | 0 | 0 | 0 | 0 | 165 | D | 0 | 0 | 1 | 1 | 0 | 0 | 1 | 1 |
| 0 | ① | 1 | 1 | 1 | 0 | 0 | 0 | 0 | 0 | 0 | 0 | 0 | 1 | 180 | E | 0 | 0 | 1 | 1 | 0 | 1 | 1 | 0 |
| 30 | ② | 1 | 1 | 0 | 0 | 0 | 0 | 0 | 0 | 0 | 0 | 1 | 1 | 195 | F | 0 | 0 | 1 | 1 | 1 | 1 | 0 | 0 |
| 60 | ③ | 1 | 0 | 0 | 0 | 0 | 0 | 0 | 0 | 0 | 1 | 1 | 1 | 210 | G | 0 | 1 | 1 | 0 | 1 | 1 | 0 | 0 |
| 90 | ④ | 0 | 0 | 0 | 0 | 0 | 0 | 0 | 0 | 1 | 1 | 1 | 1 | 225 | H | 1 | 1 | 0 | 0 | 1 | 1 | 0 | 0 |
| 120 | ⑤ | 0 | 0 | 0 | 0 | 0 | 0 | 0 | 1 | 1 | 1 | 1 | 0 | 240 | A | 1 | 1 | 0 | 0 | 1 | 0 | 0 | 1 |
| 150 | ⑥ | 0 | 0 | 0 | 0 | 0 | 0 | 1 | 1 | 1 | 1 | 0 | 0 | 255 | B | 1 | 1 | 0 | 0 | 0 | 0 | 1 | 1 |
| 180 | ⑦ | 0 | 0 | 0 | 0 | 0 | 1 | 1 | 1 | 1 | 0 | 0 | 0 | 270 | C | 1 | 0 | 0 | 1 | 0 | 0 | 1 | 1 |
| 210 | ⑧ | 0 | 0 | 0 | 0 | 1 | 1 | 1 | 1 | 0 | 0 | 0 | 0 | 286 | D | 0 | 0 | 1 | 1 | 0 | 0 | 1 | 1 |
| 240 | ⑨ | 0 | 0 | 0 | 1 | 1 | 1 | 1 | 0 | 0 | 0 | 0 | 0 | 300 | E | 0 | 0 | 1 | 1 | 0 | 1 | 1 | 0 |
| 270 | ⑩ | 0 | 0 | 1 | 1 | 1 | 1 | 0 | 0 | 0 | 0 | 0 | 0 | 315 | F | 0 | 0 | 1 | 1 | 1 | 1 | 0 | 0 |
| 300 | ⑪ | 0 | 1 | 1 | 1 | 1 | 0 | 0 | 0 | 0 | 0 | 0 | 0 | 330 | G | 0 | 1 | 1 | 0 | 1 | 1 | 0 | 0 |
| 330 | ⑫ | 1 | 1 | 1 | 1 | 0 | 0 | 0 | 0 | 0 | 0 | 0 | 0 | 345 | H | 1 | 1 | 0 | 0 | 1 | 1 | 0 | 0 |
| 0 | ① | 1 | 1 | 1 | 0 | 0 | 0 | 0 | 0 | 0 | 0 | 0 | 1 | 0 | A | 1 | 1 | 0 | 0 | 1 | 0 | 0 | 1 |
| 30 | ② | 1 | 1 | 0 | 0 | 0 | 0 | 0 | 0 | 0 | 0 | 1 | 1 | 15 | B | 1 | 1 | 0 | 0 | 0 | 0 | 1 | 1 |
| 60 | ③ | 1 | 0 | 0 | 0 | 0 | 0 | 0 | 0 | 0 | 1 | 1 | 1 | 30 | C | 1 | 0 | 0 | 1 | 0 | 0 | 1 | 1 |
| 50 | ④ | 0 | 0 | 0 | 0 | 0 | 0 | 0 | 0 | 1 | 1 | 1 | 1 | 45 | D | 0 | 0 | 1 | 1 | 0 | 0 | 1 | 1 |
| 120 | ⑤ | 0 | 0 | 0 | 0 | 0 | 0 | 0 | 1 | 1 | 1 | 1 | 0 | 60 | E | 0 | 0 | 1 | 1 | 0 | 1 | 1 | 0 |

FIG. 25

| IMAGE TAKE-IN START | | IMAGE CHECKER JUDGEMENT OUTPUT | | | | | | | | | | | |
|---|---|---|---|---|---|---|---|---|---|---|---|---|---|
| | | ① A | 2 A | 3 B | 4 B | ⑤ A | 6 A | 7 B | 8 B | ⑨ A | 10 A | 11 B | 12 B |
| A | B | | | | | | | | | | | | |
| CP | | | | | | | | | | | | | |
| 1 | 2 | ③ | 4 | 5 | 6 | ⑦ | 8 | 9 | 10 | ⑪ | 12 | 13 | 14 |

| | | | |
|---|---|---|---|
| (540) 180 | | | |
| | 189  189<br>↕(549)↕<br>↕(556)↕<br>196  196 | 196(556)<br>↑<br>B<br>e | |
| (570) 210 | | | |
| | 219  219<br>↕(579)↕<br>↕(586)↕<br>226  226 | 226(586)<br>↑<br>B<br>f | |
| (600) 240 | | | |
| | 249  249<br>↕(609)↕<br>↕(616)↕<br>256  256 | 256(616)<br>↑<br>A<br>c | |
| (630) 270 | | | |
| | 279  279<br>↕(639)↕<br>↕(646)↕<br>286  286 | 286(646)<br>↑<br>A<br>d | |
| (660) 300 | | | |
| | 309  309<br>↕(669)↕<br>↕(676)↕<br>316  316 | 316(676)<br>↑<br>B<br>g | |
| (690) 330 | | | |
| | 339  339<br>↕(699)↕<br>↕(706)↕<br>346  346 | 346(706)<br>↑<br>B<br>h | |
| (720) 360 | | | |

HOLLOW BODY INSPECTION SYSTEM, HOLLOW BODY INSPECTION APPARATUS AND SIGNAL TRANSMISSION APPARATUS

BACKGROUND OF THE INVENTION

This invention relates to a tubular body inspection system and a tubular body inspection apparatus for inspecting the internal surface of a tubular body to be inspected such as a laminate tube, etc. before the tubular body is filled with a material, and a signal transmission device used in a tubular body inspection apparatus and for transmitting a signal from a rotary body to signal processing means.

Hitherto, in manufacturing a tubular body such as a laminate tube, after manufactured, it was required to inspect defectives such as flaw, contaminant or attachment of hair on the internal surface of the tubular body before the tubular body is filled with a material such as tooth paste, etc. As a method of inspecting defectives such as flaw or contaminant, etc. on the internal surface of the tubular body, a method of carrying out eye observation by human being was a main current.

With this system, however, there is a limit in efficiency of inspection. Even if the manufacturing process for a laminate tube is automated and/or is carried out at a high speed, there was the problems that the total speed in this inspection process is limited and that such a process cannot be completely automated.

Further, in such a tubular body inspection apparatus it is conceivable to mount laminate tubes on a rotary table to inspect them in succession. However, if, in transmitting such inspection information signals to a signal processing device, a camera for inspecting laminate tubes is rotated in correspondence with rotational movement of the laminate tubes, a rotary contact member must be used for the purpose of transmitting inspection information from the camera to a fixed signal processing device As a result, an electrical signal transmission cannot be securely conducted.

SUMMARY OF THE INVENTION

An object of this invention is to provide a tubular body inspection system and a tubular body inspection apparatus capable of automatically inspecting the internal surface of a tubular body at a high speed and with a high accuracy, thus to reject defectives.

Another object of this invention is to provide a signal transmission device capable of securely transmitting a signal in a non-contact state in a signal transmission between a rotary section and a fixed section, and of having less noise mixed from the external.

In accordance with one aspect of this invention, there is provided a tubular body inspection system comprising: a carrying path in a loop form; carrying means moving on the carrying path and capable of carrying a tubular body to be inspected transfer means provided at a position in the vicinity of the carrying path to transfer the tubular body to be inspected from the outside onto the carrying means; inspection means positioned on the downstream side of the transfer means in the vicinity of the carrying path, and inserted into the tubular body to be inspected while moving together with the carried tubular body to be inspected to pick up an image of the internal surface of the tubular body to be inspected to output a video signal thereof; transmission means for taking out the video signal from the inspection means in a non-contact state to transmit the signal; image processing means for receiving the transmitted video signal to discriminate the state of the internal surface of the tubular body to be inspected on the basis of the video signal whereby when the image processing means detects a defective tubular body, it outputs a defective detection signal specifying the defective tubular body; a defective tubular body rejection means positioned on the downstream side of the inspection means in the vicinity of the carrying path to reject a corresponding defective tubular body from the carrying means on the basis of the defective detection signal; and take-out means positioned on the downstream side of the defective tubular body rejection means in the vicinity of the carrying path for taking out the carried tubular body from the carrying means to discharge it outside.

Further, in accordance with another aspect of this invention, there is provided a tubular body inspection apparatus comprising: carrying means for carrying a tubular body having a bottom surface on its one end; image pick up means carried in association with the tubular body and inserted into the tubular body to pick up an image of the internal surface of the tubular body to output a video signal; transmission wave formation means for forming a transmission wave for the purpose of transmitting the video signal from the image pick up means; signal transmission and reception means for transmitting the video signal in a non-contact state; and image processing means for processing the video signal transmitted through the signal transmission and reception means to discriminate the state of the internal surface of the tubular body.

Furthermore, in accordance with a further aspect of this invention, there is provided a signal transmission device in which two ring-shaped conductors from which lead wires are drawn are oppositely arranged in a ring-shaped hollow chamber provided within an electromagnetic shielding body, a ring-shaped conductor on any one side being rotatable about its axis.

In addition, other objects, effects and advantages of this invention will be described in detail with reference to the attached drawings.

BRIEF DESCRIPTION OF THE DRAWINGS

FIG. 4 is a plan view showing a portion in the vicinity of a tube take-out unit in FIG. 1.

FIGS. 9A and 9B are explanatory views of the action of a centering jig.

FIG. 24 is an explanatory view of the operating state of image checkers corresponding to the respective CCDs.

FIGS. 25 and 26 are explanatory views of the operating state of an image checker.

PREFERRED EMBODIMENTS OF THE PRESENT INVENTION

Figure 1:
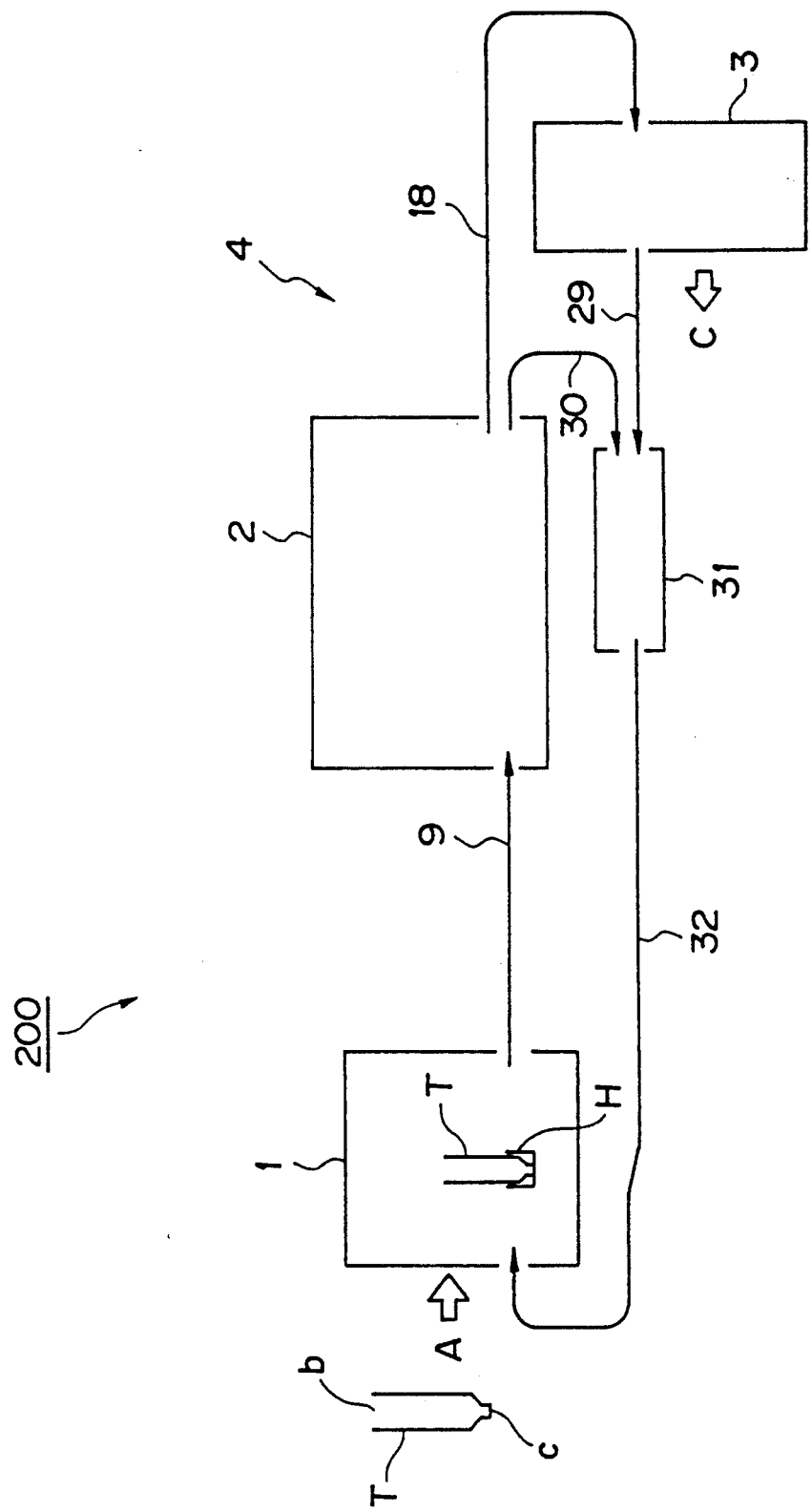
FIG. 1 is a block diagram showing the outline of a tubular body inspection system according to this invention.

Preferred embodiments of this invention described with reference to the attached drawings.

In these embodiments, there is disclosed an example where a laminate tube is used as a tubular body which is an object to be inspected. FIG. shows the outline of the configuration of a tube inspection system according to an embodiment of this invention. This tube inspection system 200 comprises a tube supply unit 1 for supplying a laminate tube T opened at a squeezing opening o for squeezing a material to be contained therefrom and at a bottom portion b, a rotary type tube inspecting machine 2 for inspecting the internal surface of the tube, a tube take-out unit 3 for transferring satisfactory or good tubes having been inspected into a box, and a carrying device 4 composed of a plurality of conveyers, etc.

Further, at the tube supply unit 1, the tube T is carried while its lower portion is held by a holder H. The carrying device 4 comprises a carrying conveyer 9 connecting the tube supply unit 1 with the tube inspecting machine 2, a good article carrying conveyer 18 for carrying good articles having been inspected, a carrying conveyer 29 for carrying empty holders H from which good tubes are taken out by the tube take-out unit 3, a carrying conveyer 30 for carrying empty holders H from which defective articles among articles having been inspected are removed, and a carrying conveyer 32 arranged between a converging device 31 at which empty holders are converged and the tube supply unit 1. The laminate tube T is taken in from the direction indicated by A in the figure, and undergoes inspection. The laminate tube thus inspected is transferred in a direction indicated by C from the tube take-out unit 3, and is then sent out to the next stage of work.

Figure 2:
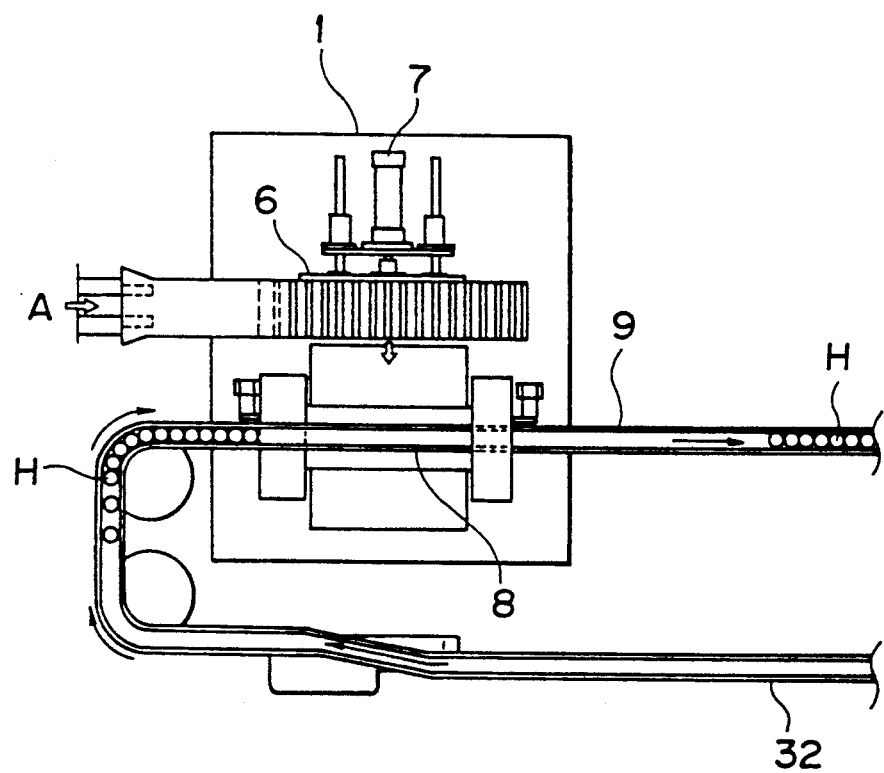
FIG. 2 is a plan view of a tube supply unit in FIG. 1.
Figure 3:
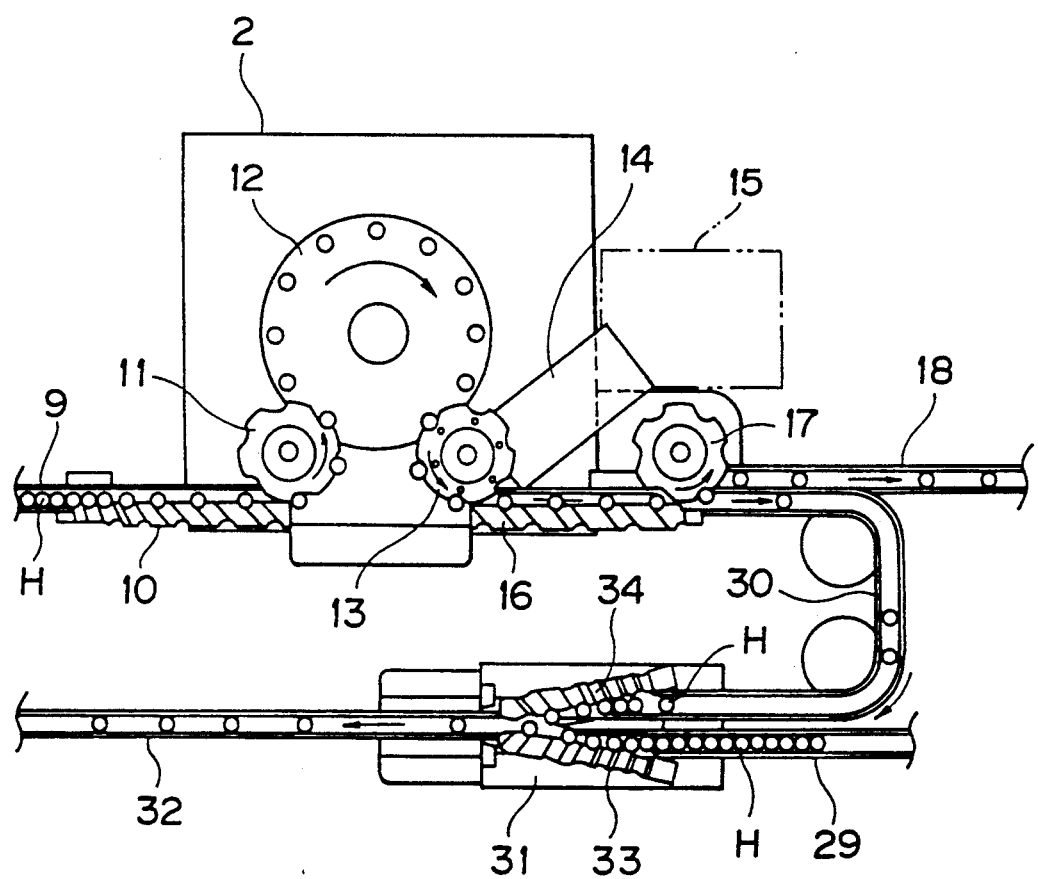
FIG. 3 is a plan view showing a portion in the vicinity of a rotary type tube inspecting machine in FIG. 1.

In FIG. 2, the tube supply unit includes an accumulation conveyer 6. The tube T delivered in a horizontal state by the accumulation conveyer 6 is extruded in a lateral direction by a pusher 7. After the tube is arranged in a vertical direction, it is held in an upset state (the squeezing opening o being directed downward) by the tubular holder H stopped on the carrying conveyer 9. The tube held by the holder H is sent to a rotary type tube inspecting machine 2 as shown in FIG. 3. On the entrance side of the inspecting machine 2, a timing screw 10 for widening the interval between holders H is arranged along the conveyer 9. Adjacently to the timing screw 10, an entrance star wheel 11 is provided. By this star wheel 11, the tube T held by the holder H is delivered to a predetermined position of a rotary inspection table 12. The inspected tube T is subjected to the following processing by an exit star wheel 13. Namely, in the case of an unsatisfactory or defective article, only a corresponding tube T is ejected into an ejection pool 15 via a defective article ejection shoot 14 and the empty holder H is sent to the converging unit 31 through the carrying conveyer 30.

It is to be noted that a timing screw 16 is provided adjacently to the exit star wheel 13, and good articles are transferred to the carrying conveyer 18 by a star wheel 17. Since the star wheel 17 holds tubes T, and defective tubes have been already rejected, only the empty holders travel on the carrying conveyer 30 and reach the converging device 31. In the converging device 31, screws 33 and 34 are arranged in the form of a sqeezed opening. Thus, this device 31 serves to send interchangeably empty holders H from the carrying conveyers 29 and 30 onto the carrying conveyer 32.

The tube take-out unit 3 includes stoppers 19 and 21 provided with a spacing for arranging and stopping a predetermined number of holders H holding good tubes T therebetween as shown in FIG. 4. A tube box packing device 27 moves in an upper direction of the holded tubes and grasps or grips a large number of tubes T arranged to accommodate them into boxes 24 partitioned by partitions every columns. These boxes 24 are sent in a direction indicated by B from the right side, in the figure, of a box carrying conveyer 23, and reach a box conveyer 26. While slightly moving the boxes 24 on the box conveyer 26 every a fixed pitch in a direction perpendicular to the box carrying conveyer 23, the tubes T are accommodated at a fixed position by the tube box packing device 27. After packed into the box, articles are sent onto the box carrying conveyer 23 to move in a direction C and are sent out to the next stage of work.

At the tube take-out unit 3, a predetermined number of laminate tubes T and holders H are first stopped by the stopper 21 and are then stopped by the stopper 19. Thereafter, these laminate tubes T are gripped by the tube box packing device 27, and are packed into the box 20 on the conveyer 26 every column. Empty boxes 24 are suitably transferred to the lower part of the tube box packing device 27. The tube box packing device 27 packs accumulated laminate tubes T every a predetermined number thereof.

At the tube take-out unit 3, the holders H from which only laminate tubes T are taken out are carried to the converging device 31 by an empty holder carrying conveyer 30. Further empty holders sorted by the sorting star wheel 17 are also carried to the converging device 31. This converging device 31 includes two timing screws to converge these holders in row to mount them on an empty holder carrying conveyer 32. The empty holder carrying conveyer 32 carries empty holders to the tube supply unit 1.

The operation of the tube inspection system will now be described.

Laminate tubes T are carried in a direction A from the preceding stage of work, and are accumulated by the accumulation conveyer 6. Thereafter, they are correctively extruded or pushed every a predetermined number thereof by the pusher 7, and are mounted onto holders H on the carrying conveyer 9 by a tube insertion jig 8. These laminate tubes T are carried in a direction of the rotary type tube inspecting machine 2 by the carrying conveyer 9 in the state where they are mounted on the holders H. When they reach the position in the vicinity of the rotary type tube inspecting machine 2, respective holders H travel in the state where they are arranged at a predetermined interval by the timing screw 10 in a screw form, and are then mounted onto the rotary inspection table 12 of the rotary type tube inspecting machine 2 by the star wheel in a star form.

The rotary inspection table 12 inspects the inside of the laminate tube T while rotating in a clockwise direction in the figure. The detailed configuration and operation of the rotary type tube inspecting machine 2 will be described in detail later. As the result of inspection, in the case where laminate tubes are judged to be defective, at the star wheel 13 in a star form functioning as a defective article rejection member, only defective laminate tubes T are taken out in an upper direction from the holders H to be ejected. Such laminate tubes are accumulated into the defective article pool 15 via the defective article ejection shoot 14.

In this way, in the middle of the process for manufacturing laminate tubes T, the insides of the laminate tubes T can be automatically inspected. Here, the carrying device 4 corresponds to the carrying path, and the carrying device and the holders H constitute carrying means. The tube supply unit I constitutes transfer means. The star wheel 13 functioning as a defective article ejection member and the defective article ejection shoot 14 constitute defective article rejection means. In addition, the tube take-out unit 3 corresponds to take-out means.

The configuration of the rotary type tube inspecting machine 2 will now be described.

Figure 5:
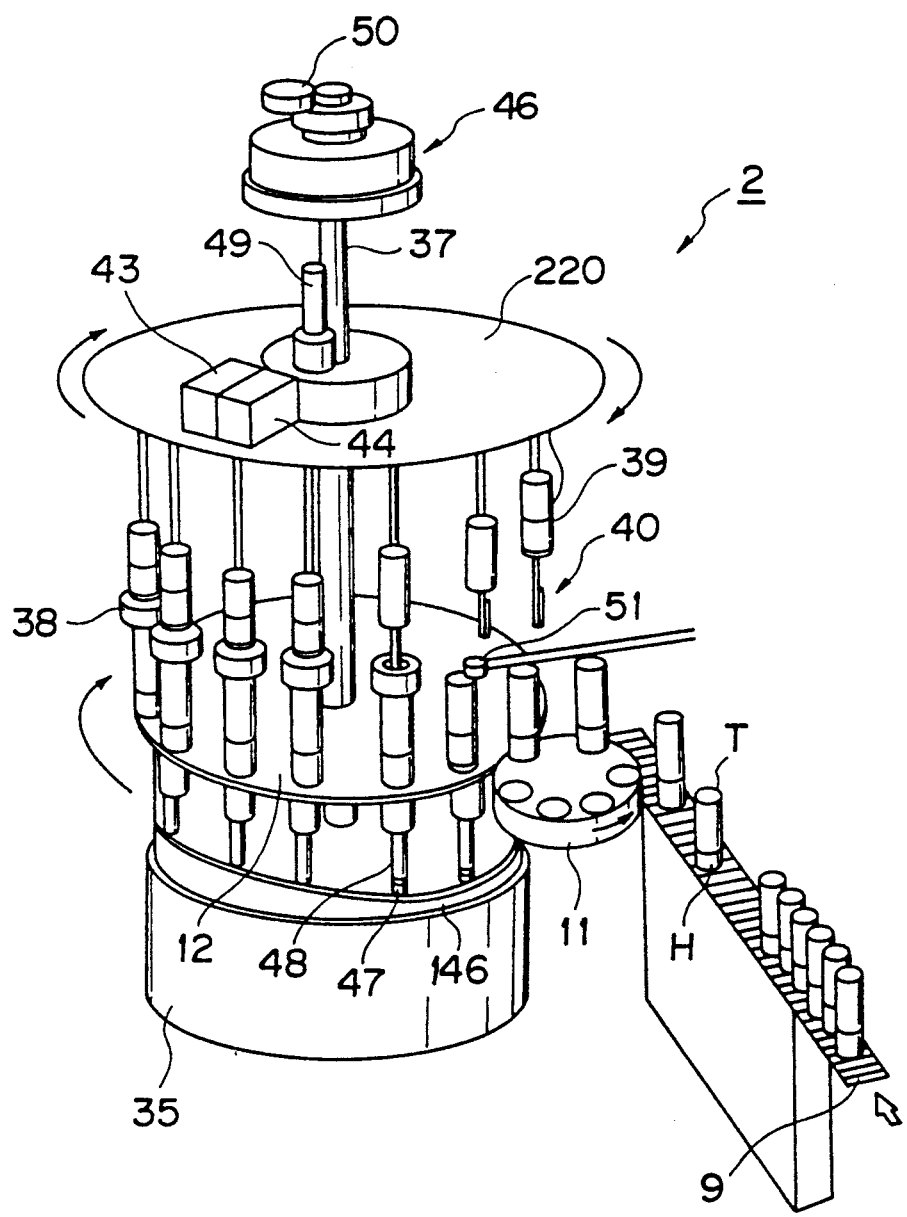
FIG. 5 is a perspective view of a rotary type tube inspecting machine.
Figure 6:
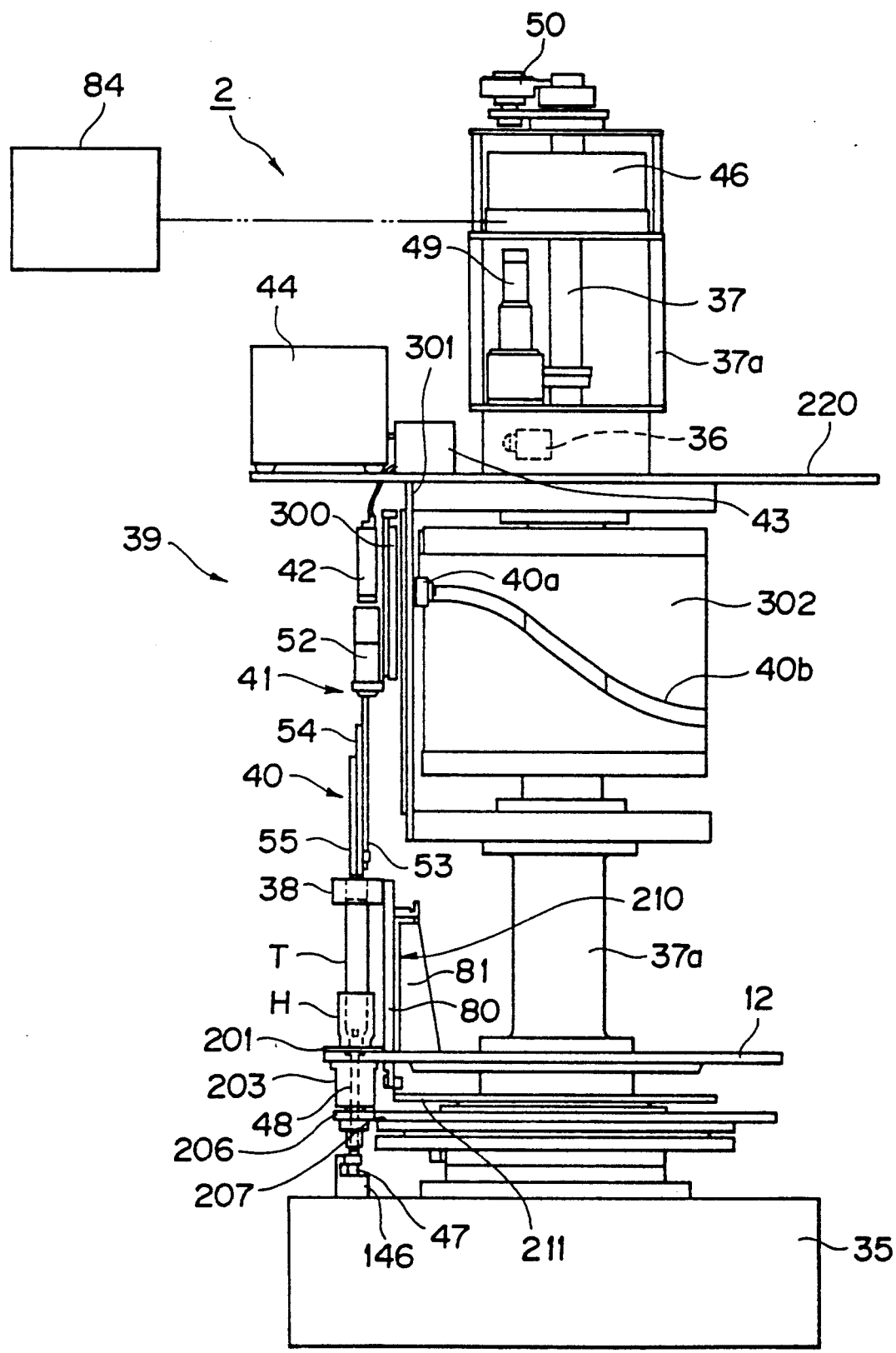
FIG. 6 is a front view of the rotary type inspecting machine.
Figure 8:
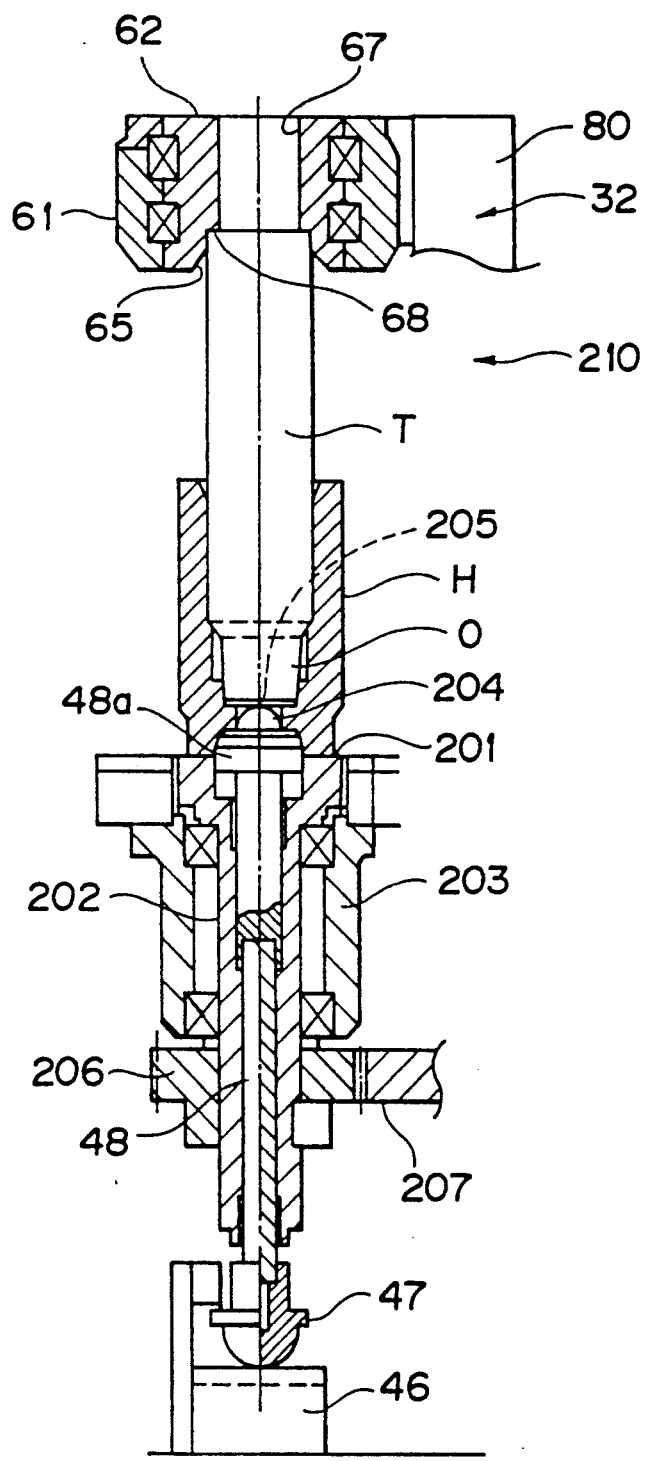
FIG. 8 is a cross sectional view showing a tube holding state on the tube inspecting machine.

In FIGS. 5 and 6, the rotary type tube inspecting machine 2 includes a base 35. At the center of the base 35, a fixed shaft 65 (FIG. 11) is provided. A tubular rotary shaft 37 having a shaft center common to that of the fixed shaft 65 is provided so as to cover the fixed shaft 65. The rotary shaft 37 holds a rotary cylinder 37a (FIG. 11), and the rotary shaft 37 is rotationally driven by a motor 36. In order to measure angular position of the fixed shaft 65 and the rotary shaft 37, a rotary resolver 49 and a fixed resolver 50 are provided at the upper part of a rotary top plate 220 and at the upper end of the fixed shaft 65, respectively. The rotary inspection table 12 provided above the base 35 is coupled to the rotary cylinder 37a and rotates in association with the rotary shaft 37. On the rotary inspection table 12, the holder H for holding the tube T can be mounted. Holders H are synchronously delivered onto holder seats 201 provided at a predetermined interval on the rotary inspection table 12 by the action of the star wheel 11. As shown in FIG. 8, these holder seats 201 are formed on the upper surface of a rotary body 202. This rotary body 202 is rotatably held by a holding body 203 fixed on the lower surface of the rotary inspection table 12. A centering shaft 48 for centering the holder H is supported within the rotary body 202 so as to be slit upward and downward. The upward and downward operation of the centering shaft 48 is carried by a cam 146 annularly arranged on the base 35 and a cam follower 47 provided at the lower end of the centering shaft 48. In the holder H, a portion, on the squeezing exit side, of the laminate tube is opened, whereby an opening 204 is formed. Into the opening 204, the upper end of the centering shaft 48, is fitted or inserted.

At the lower portion of the rotary body 202, a gear 206 is fixed. This gear 206 meshes with an index toothed wheel 207, and rotates by 90 degrees at a predetermined angular position of the rotary inspection table 12 by the action of the index toothed wheel 207. Thus, the holder seats 201 of the rotary inspection table 12 rotate, and the tube T held by the holder H rotates by 90 degrees in accordance with rotation of the holder T.

At the inside of the respective holder seats 201 of the rotary inspection table 12, a centering device 210 for circularly holding the rear side of the tube T is provided. This centering device 210 is provided with a tubular centering jig 38. This centering jig 38 can move upward and downward by a predetermined distance. Namely, the centering jig 38 is fixed on the upper end of a supporting rod 80. This supporting rod 80 is supported by a supporting frame 81 vertically provided on the rotary inspection table 12, and the lower end of the supporting rod 80 is in contact with the cam surface of a circular cam plate 211 in a manner to penetrate the rotary supporting table 12. The supporting rod 80 is downwardly biased by a bias member (not shown). At the position where the holder H which has hold the tube T is delivered to the rotary inspection table 12, the supporting rod 80 is located at an elevated position.

After the holder is delivered, the supporting rod is lowered to carry out centering operation for the upper end (rear end) of the tube T.

The centering jig 38 includes, as shown in FIG. 8, an outer tube 61 supported by the supporting rod 80 and an inner tube 62 rotatably supported inside the outer tube 61. This inner tube 62 is provided with an opening 67, is also provided at the lower end portion thereof with an inclined guide surface 65, and is further provided at the inner end of the inclined guide surface 65 with a step portion 66. The peripheral edge of the rear end portion of the tube T is engaged with the step portion 68. When the centering jig 38 allows the rear end of the tube T to be held down from an upper direction, even if it is deformed so as to take an elliptic form as shown in FIG. 9A, the shape thereof becomes circular. Thus, centering is carried out (FIG. 9A).

Figure 7A:
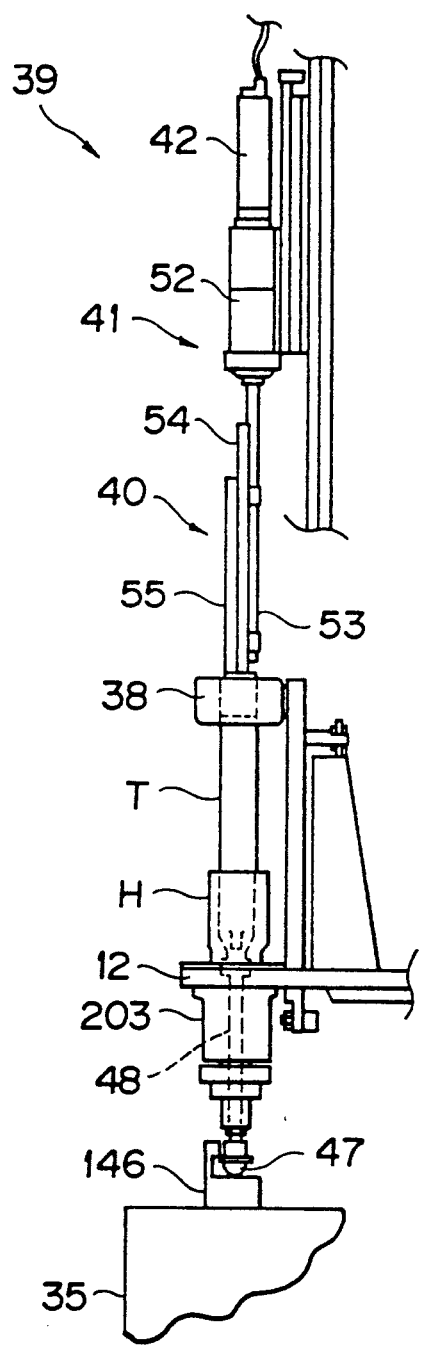
FIG. 7A is a side view of a tube inside inspection device.
Figures 10A, 10B:
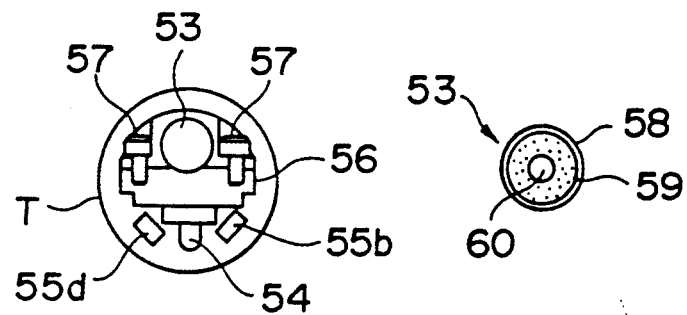
FIG. 10A is a plan view of a tube inside surface inspection device.
FIG. 10B is a lateral cross section of a bore scope.

On the other hand, on the lower surface of the rotary top plate 220, tube inside inspection devices (image pick up device) 39 for inspecting the inside of the laminate tube T are provided in correspondence with the holder seats 201. Each inspection device 39 is passed through the centering jig 38, and is then inserted into a tube T to be inspected to inspect the inside of &he tube. The tube inside inspection device 39 includes, as shown in FIGS. 7A and 10, a portion 40 inserted into the tube, a bore scope 41 for inspecting a portion in the vicinity of the squeezing opening of the tube, and a CCD camera 42 provided on the upper end of the bore scope 41. This bore scope 41 includes a bore scope body 52, and a bore scope insertion portion 53. The portion 40 inserted into the tube includes the bore scope insertion portion 53 inserted into the tube T, a light emitting diode section 54 irradiating the inside surface of the tube T, and a photo sensor section 55 for sensing a light irradiated from the light emitting diode section 54 and reflected at the inside surface of the tube T. Among these members, the bore scope insertion portion 53 mainly inspects the internal bottom surface side, i.e., the squeezing opening side, in the figure of the laminate tube T, and the light emitting diode section 54 and the photo sensor section 55 mainly inspect the inside surface of the laminate tube T.

At the portion 40 inserted into the tube, a connection metal fitting 56 is attached to the light emitting diode 54 of the bore scope 41 through bolts 57. At the center of the connection metal fitting 56, the elongated light emitting diode section 54 and photo sensors 55a, 55b, 55c, 55d, 55e and 55f arranged in a staggered form on the left and right sides of the light emitting diode section 54 are attached.

At the bore scope insertion section 53, a lens section 60 for picking up an image is provided inside a stainless tube 58, and a light source bore fiber section 59 including a fine grass fiber is provided around the lens portion 60. While the end surface S of the bore scope insertion section 53 is vertical to the axis of the bore scope insertion section 53, it may take a form obliquely cut at a certain angle with respect to the axis (inclined surface S1). In this case, the visual field is expanded not only in a vertical lower direction but also in an oblique direction. In addition, the bore scope insertion section 53 is inserted in the state eccentric with respect to the axis of the laminate tube T.

Figures 10C, 10D:
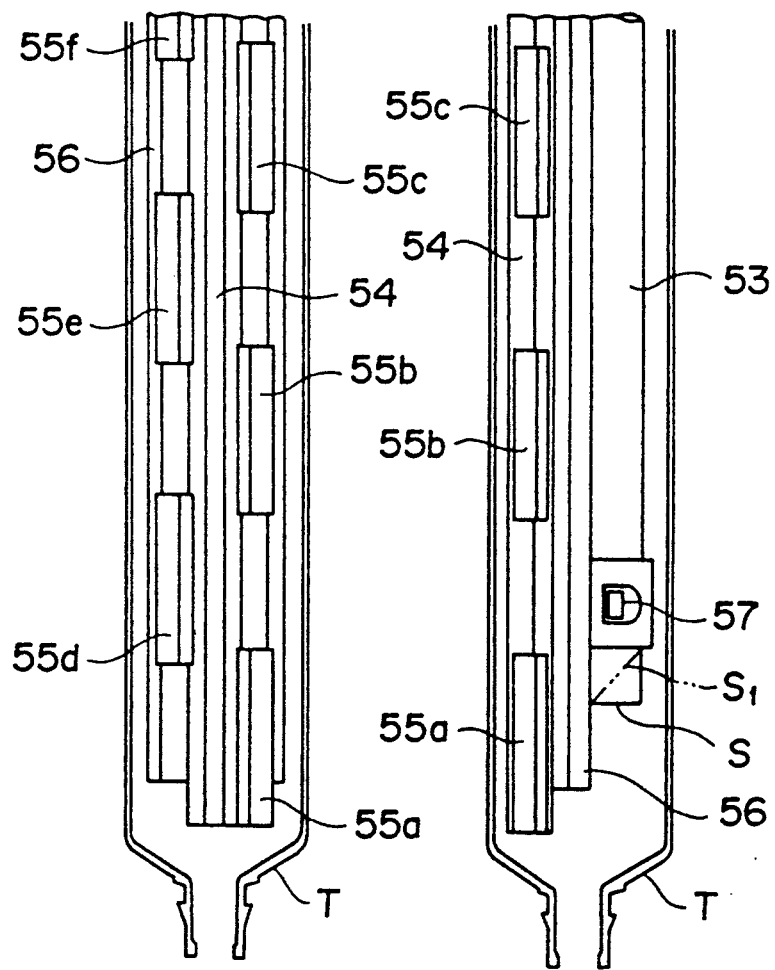
FIGS. 10C and 10D are first and second side views of the bore scope shown in FIG. 10B.

The light emitting diode section 54 has a length sufficient to cover the range from the internal bottom surface to the upper opening surface of the laminate tube T, thus making it possible to irradiate the inside surface from the upper end to the lower end. Respective pairs of photosensors 55a to 55f are provided every three photosensors on the both sides of the light emitting diode section 54. As shown in FIG. 10C, these photosensors are provided so that inspection regions overlap with each other. By such a configuration, photosensors 55a to 55f can inspect the inside surface while the laminate tube T revolves on its axis. In this case, photosensors 55a to 55f may be provided in alignment with each other, and other photoelectric conversion elements except for the photo sensor, e.g., CCD element, etc. may be employed.

As shown in FIG. 6, the CCD camera 42 and the bore scope 41 are supported by a slider 300. This slider 300 can slide upward and downward on a guide plate 301 vertically projected from the rotary top plate 220. Further the slider 300 is provided with a cam follower 40a. This cam follower 40a is engaged with a cam groove 40b formed around the rotary drum 302 rotating along with the rotary shaft 37. By the cam follower 40a and the cam groove 40b, the tube inside inspection device 39 moves upward and downward at a predetermined position.

Figure 11:
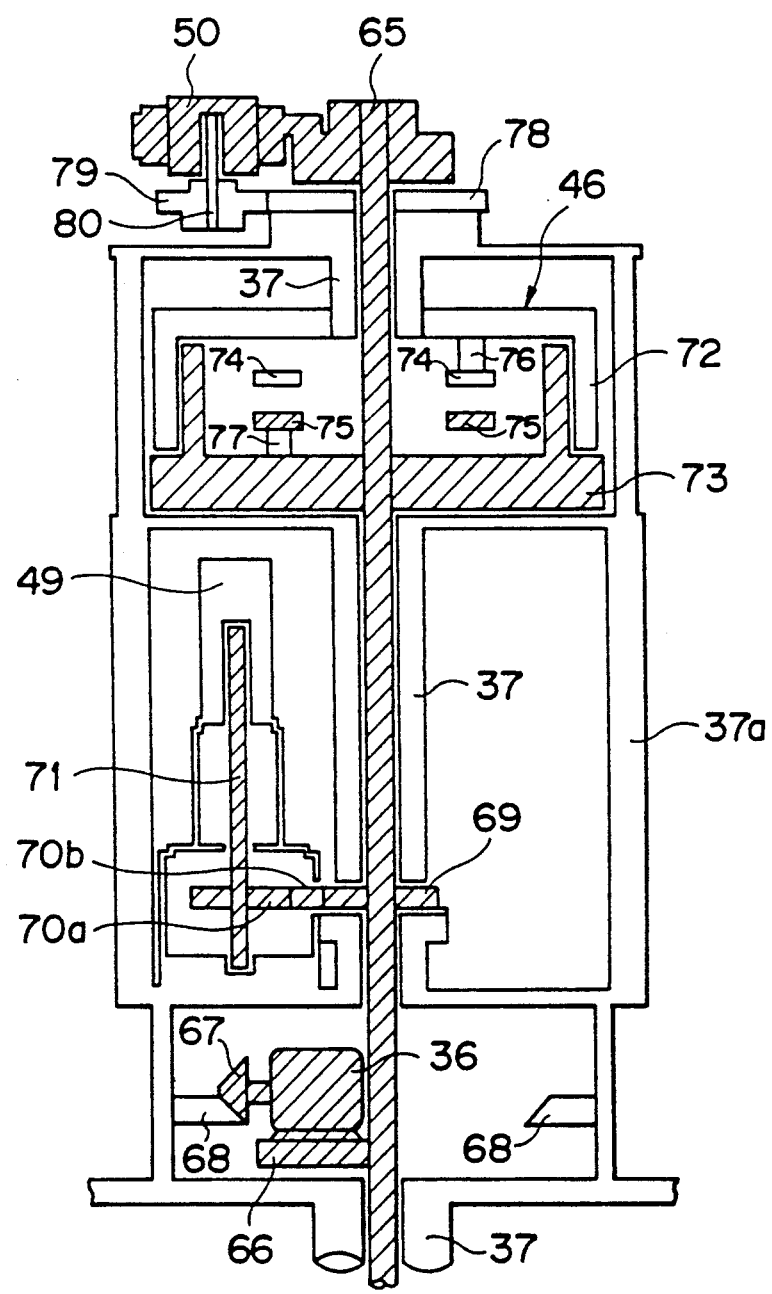
FIG. 11 is a cross sectional view showing the upper part of a tube inspecting machine.
Figure 12A:
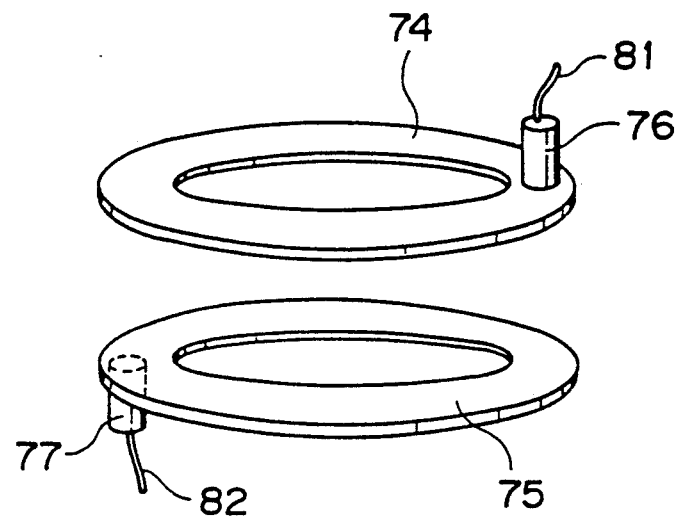
FIG. 12A is a perspective view of an antenna.

At the upper portion of the tube inspection device 2, an antenna section 46 is provided as shown in FIGS. 11 and 12. This antenna section 46 includes a transmitting antenna 74 and a receiving antenna 75 provided oppositely to each other in an annular form, a tubular electromagnetic shielding cover 72 for electromagnetically shielding these antennas, an electromagnetic shielding cover 73 cooperating with the cover 72, metal fittings 76 and 77 for affixing the antennas to the respective covers, and lead wires 81 and 82 (FIG. 12A) connected to the metal fittings 76 and 77 to deliver signals. As shown in FIG. 11, the transmitting antenna 74 on the upper side is attached on the rotating cover 72, this cover 72 connected to the rotary shaft 37. The receiving antenna 75 is attached to the fixed cover 73 connected to the fixed shaft 65. The transmitting antenna 74 and the receiving antenna 75 are always opposite to each other in a non-contact state even if the rotary block (rotary shaft 37 and rotary tube 37a, etc.) rotates. Thus, these antennas can stably carry out transmission and reception of an information signal. Further, since these antennas are electromagnetically shielded by the electromagnetic shielding covers 72 and 73, there is no possibility that they undergo the influence of noise from the external.

Figure 12B:
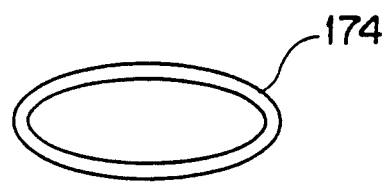
FIG. 12B is a perspective view showing another embodiment of an antenna.
Figure 12C:
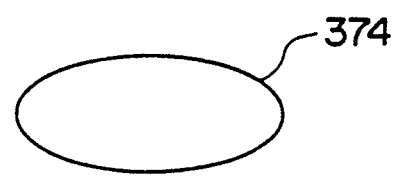
FIG. 12C is a perspective view showing a further embodiment of an antenna.

While explanation has been given in connection with an example where the transmitting antenna and the receiving antenna of the ring-shaped conductor are in the form of an annular plate, they may be a ring wire 174 or a circular plate 374 (FIGS. 12B and 12C).

The configuration of the rotary resolver 49 and the fixed resolver 50 will now be described.

The resolver is a device for providing angular position information of a rotary shaft, etc. in the form of an electric signal. As shown, the rotary resolver 49 is a resolver for detecting angular position information on a rotary block side, and the resolver body is attached to the rotary block side. The shaft 71 serving as reference of rotation is of a structure so as to indicate an angular position equal to that of the fixed shaft 65 through a gear 69 fixed on the fixed shaft 65, a gear 70a fixed on the shaft 71, and a planetary gear 70b positioned between the both gears 69 and 70a. In this embodiment, there is provided an arrangement such that the number of the gear 69 and that of the gear 70a are equal to each other. By employing such an arrangement, the shaft 71 indicates an angular position equal to that of the fixed shaft 65 at all times. Further, the fixed resolver 50 provided on the upper end of the device is a resolver for detecting angular position information on the fixed side, and the resolver body is attached to the fixed block side (fixed shaft 65, cover 73, etc.). The fixed resolver 50 has a rotary shaft 80. This rotary shaft 80 has a gear 79. This gear 79 meshes with a gear 78 formed on the upper surface of the rotary tube 37a. In this case, the number of teeth of the gear 78 is set to a value twice greater than the number of teeth of the gear 79. Namely, the rotational angle of the rotary shaft 80 of the fixed resolver 50 is set to a value one half of the rotational angle of the rotary shaft 71 of the rotary resolver 49.

The motor 36 is mounted on a motor table 66 fixed on the fixed shaft 65. This motor 36 rotates the rotary block by a drive gear 67 of the motor 36 and an annular gear 68 attached inside the rotary tube 37a. It is to be noted that the fixed block is indicated by slanting lines for convenience of explanation.

Figure 13:
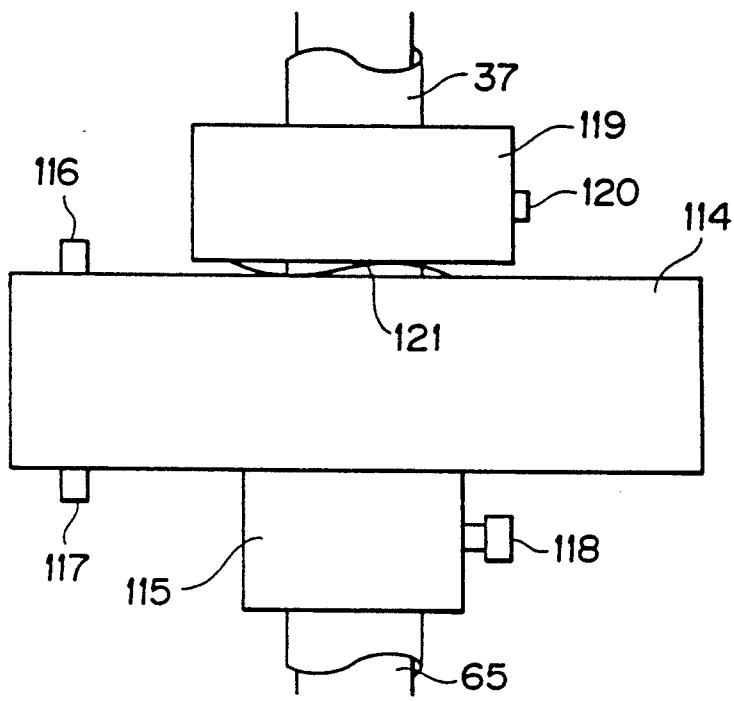
FIG. 13 is a front view showing a still further embodiment of an antenna.
Figure 14:
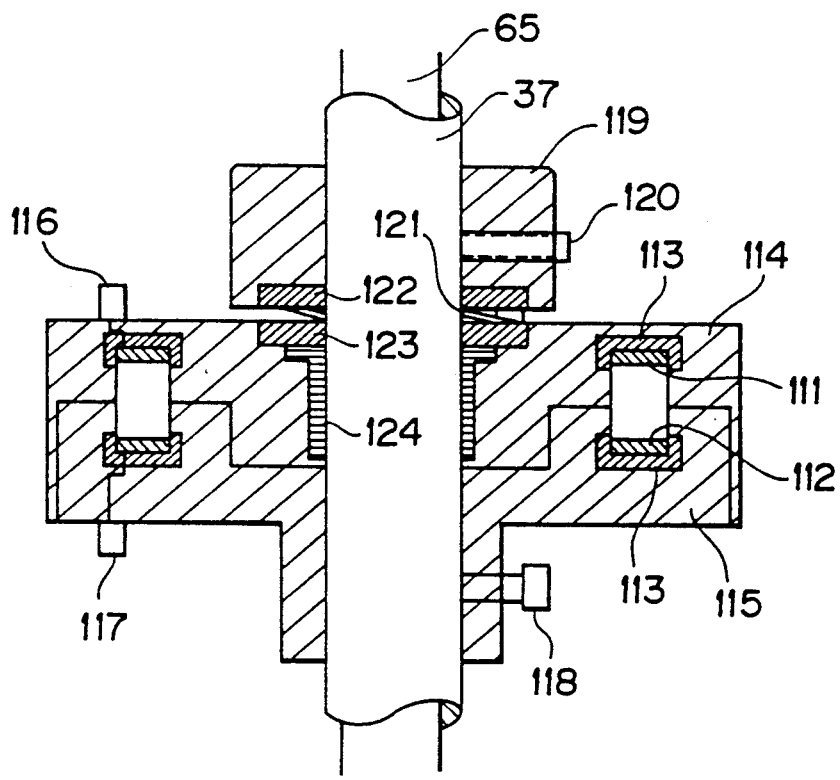
FIG. 14 is a longitudinal cross sectional view of the antenna of FIG. 13.

Further, the antenna section 46 may be constructed as shown in FIGS. 13 and 14. Namely, the antenna section roughly comprises a rotary portion 115 attached to the rotary shaft 37, a fixed portion 114 stationary with respect to the rotary shaft 37, and a thrust adjustment collar 119 for giving thrust (pushing) load to the fixed portion 114. The rotary portion 115 and the fixed portion 114 are formed of a conductor and constitutes an electromagnetic shielding body. At the inside portions of the rotary portion 115 and the fixed portion 114, ring-shaped grooves having the axis of the rotary shaft 37 as a center are formed. The grooves on the side of the rotary portion 115 and the grooves on the fixed portion 114 are adapted to be matched with each other. On the bottom surface of the respective ring-shaped grooves, a ring-shaped receiving antenna 111 is provided and a ring shaped transmitting antenna 112 is provided on the rotary portion side. The receiving antenna and the fixed portion 114 are insulated by an insulating portion 113. Further, the receiving antenna 112 and the rotary section 115 are similarly insulated by the insulating portion 113. As stated above, the receiving antenna 111 and the transmitting antenna 112 are opposite to each other with a gap therebetween. Here, the receiving antenna 111 and the transmitting antenna 112 correspond to a pair of ring-shaped conductors. A signal is inputted to the receiving antenna 112 by a BNC connector 117 and lead wires. A signal from the receiving antenna 111 is outputted by way of lead wires and a BNC connector 116. The rotary portion 115 is fixed on the rotary shaft 37 by fixing bolts 118. The thrust load adjustment collar 119 is fixed on the rotary shaft 37 by adjustment screws 120 to rotate in accordance with rotation of the rotary shaft 37. Between the thrust load adjustment collar 119 and the fixed portion 114, a pressurizing flat spring 121 is provided. Thus, the fixed portion 114 is thrust onto the rotary portion 115 at all times. Accordingly, the rotary portion 115 will rotate slidably while contacting the fixed portion 114. Further, since the pressurizing flat spring 121 slidably rotates between the thrust load adjustment collar 119 and the fixed portion 114, the portions 122 and 123 in contact with the spring are made of dry metal. Similarly, since the rotary shaft 37 and the fixed portion 114 also slidably rotate, a dry metal 124 is provided also on the rotary shaft side of the fixed portion 114.

At the rotary type tube inspection machine 2, twelve tube inside inspection devices 39 are provided, and twelve cam followers 47 and twelve holder centering shafts 48 are also provided. It is to be noted that the numbers of these members are not limited to twelve, but may take other values. Respective tube inside inspection devices 39 are connected to a camera selector 43 mounted on the rotary top plate 220. This camera selector 43 selects a detection camera and is connected to a mixer 43 for mixing detection signals (FIG. 6). The mixer 44 is connected to the antenna section 45. This antenna section 46 is connected to a signal processing device 84.

The operation of the rotary type tube inspection machine 2 will now be described.

Figure 15:
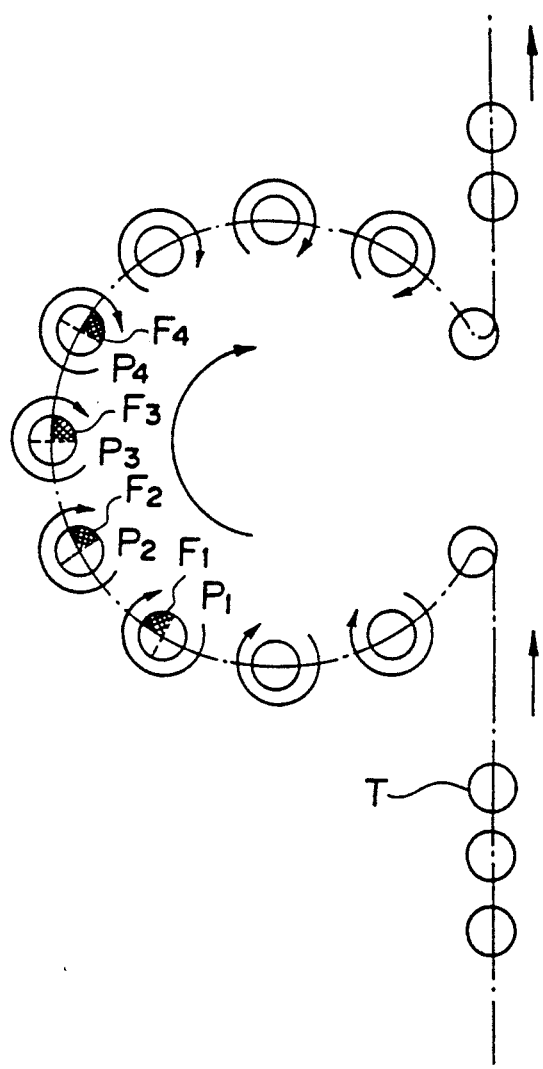
FIG. 15 is an explanatory view of the carrying state of a tube.

In FIG. 5, the laminate tube T is mounted on the holder H, and is carried in that state to the star wheel 11 by the carrying conveyer 9, etc. The star wheel 11 moves laminate tubes T together with the holders H onto the holder seats 201 of the rotating rotary inspection table 12 of the rotary type tube inspecting machine 2. After each holder H is put onto the rotary inspection table 12, the holder centering shaft 48 rises in accordance with the cam curve of the cam 146. At this time, the upper end portion of the shaft 48 is inserted into the opening 204 to carry out centering of each holder H. Further, a centering drum 48a attached to the upper end portion of the shaft 48 is also inserted into the lower portion of each holder H. At the same time, the centering jig 38 falls down. Thus, the end portion of the laminate tube T comes into contact with the guide surface 65 (FIG. 9). In the case where the laminate tube T is deformed as shown in FIG. 9A, it is guided by the guide surface 65 until the end portion of the laminate tube T comes into contact with the step portion 68 in the state of complete round as shown in FIG. 9B. In this state, the rotary body 202 revolves about its axis while revolving up to the position of the inspection position P4 by 90 degrees from the inspection position P1 as shown in FIG. 15 through the index gear 207. Namely, the rotary body 202 revolves about its axis while revolving in a rotational direction of the rotary inspection table 12. In this operation, the rotary body temporarily stops rotation for a predetermined time at the inspection positions P1, P2, P3 and P4 in the figure. The angular interval of the respective inspection positions P1 to P4 is 30 degrees. The tube T revolves about its axis during transferring to the respective inspection positions. During this revolution about its axis, the inside surface of the tube T is detected by the respective photosensors 55a to 55f.

On the other hand, in front of the inspection position P1, by downward movement of the centering jig 38, the cam follower 40a of the tube inside inspection device 39 slides in the groove 40b of the rotary drum 302, whereby the tube inside inspection device 39 lowers into the tube held circularly. Thus, the portion 40 inserted into the tube of the tube inside inspection device 39 is inserted into the tube T. In the state where the portion 40 is inserted into the tube T, the laminate tube T intermittently revolves about its axis between the points P1 to P4 to make it possible to carry out inspection of the tube internal bottom surface and the tube inside surface by the tube side inspection device 39. This intermittent revolution about its axis corresponds to a relative plane movement between the tubular body and the image pick up means. When inspection is completed in connection with one tube, a laminate tube T judged to be defective by inspection is ejected from the ejection star wheel 13 (FIG. 3). Further, before the portion 40 is inserted into the laminate tube T, whether or not a light quantity of the light emitting unit reaches a predetermined light quantity is checked by a light quantity checker 51. The checked result is used at the time of data processing. In addition, in the case where the light quantity is below a reference level, a tube checked with that light quantity is considered to be NG to produce an alarm, thus making it possible to carry out exchange of parts, etc.

Figures 16A, 16B:
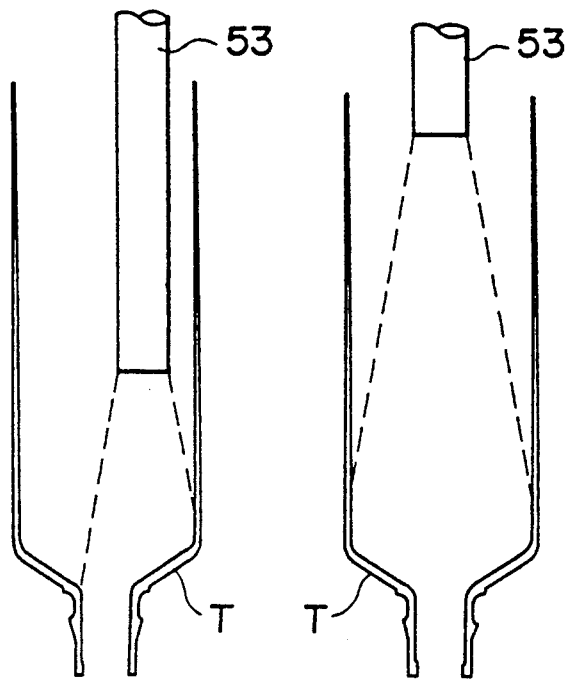
FIG. 16A is an explanatory view of another inserted state of a tube inside inspection device according to this invention.
FIG. 16B is an explanatory view of another inserted state of a tube inside inspection device.
Figures 16C, 16D:
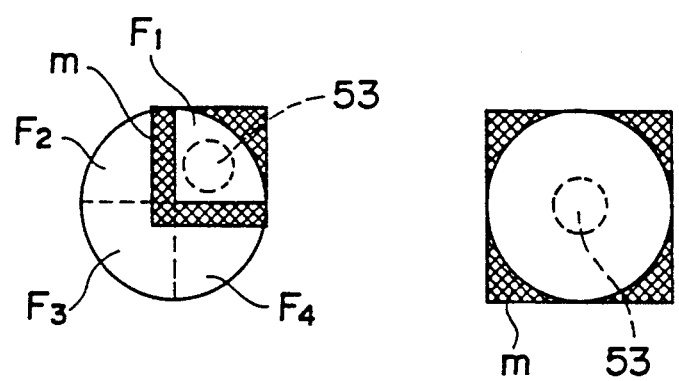
FIG. 16C is an explanatory view of an inspection region in FIG. 16A.
FIG. 16D is an explanatory view of an inspection region in FIG. 16B.

The bore scope insertion portion 53 is inserted into the tube T in an eccentric state as shown in FIG. 16. The inspectable region F1 of the bore scope insertion portion 53 becomes a portion of guadrant obtained by eliminating a mask portion (hatched portion m) from a square camera visual range. The laminate tube T intermittently carries out, as shown in FIG. 15, revolution about its axis and is temporarily stopped at the inspection positions P1, P2. P3 and P4. For this reason, at the stop time of the position P1, the inspectable region F1 in FIG. 15 can be inspected. Similarly, at the stop time of the position P2, the inspectable region F2 can be inspected. In a manner similar to the above, at the stop times of the positions P3 and P4, the inspectable regions F3 and F4 can be inspected, respectively. In this way, an approach is employed, as shown in FIGS. 16A and 16C, to divide the inspection region, and to carry out image pick up and inspection in the state where the bore scope insertion portion 53 is close to the internal surface of the laminate tube T, thereby making it possible to further improve the resolution as compared with he method of locating the bore scope insertion portion 53 on the axis of the laminate tube T to carry out inspection as a single inspection region as shown in FIGS. 16B and 16D. Thus, this method can detect a defective of more fine mixture or flaw, etc. It is to be noted that the number of division of the inspection region is not limited to four, but may be other values.

The processing of inspection information detected at the tube inside inspection device 39 will now be described with reference mainly to FIG. 17.

In this embodiment, twelve tube inside inspection devices 39 are provided at an interval of 30 degrees. The same number of CCD cameras 42a 421 are provided in correspondence with these devices 39. Any cameras among these CCD cameras are selected by the camera selector 43 to transmit an inspection signal. Namely, four cameras existing on the four inspection positions of FIG. 15 are selected in succession. Thus, the signals therefrom are mixed by the mixer 44 and are transmitted to the transmitting antenna 74.

Figure 19:
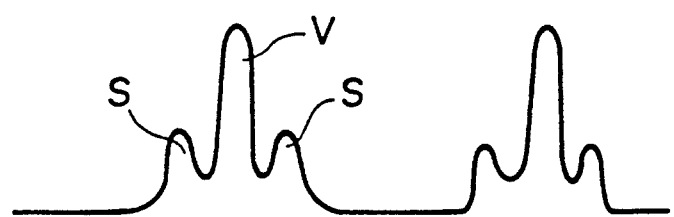
FIG. 19 is a waveform diagram of a transmitted radio wave.

Image information of the internal bottom surface of the tubes T detected by the respective CCD cameras is changed to a video signal (waveform V OF FIG. 19), and inspection information of the internal side surface of the tube T sensed at the photosensor section 55 is changed to sound signal (waveform S OF FIG. 19). The both signals thus obtained are transmitted to the mixer 44 as waveform information. When it is now assumed that numbering of the CCD cameras is carried out as shown in FIG. 20, cameras of numbers 1, 12, 11 and 10 must be selected in this state. This specifying operation of the camera numbers is carried out by reading changes in a voltage signal from the rotary resolver 49 in dependency upon a cam position.

As apparent from FIG. 15, when a laminate tube T reaches the point P4, succeeding laminate tubes T have reached the points P3, P2 and P1. For this reason, image information from four cameras are taken in at the same time. The mixer 44 respectively modulates these four image information at predetermined carrier waves and mixes them to output the mixed signal to the antenna 74. The mixed image information is transmitted from the transmitting antenna 74 to the receiving antenna 75. The transmitting antenna 74 and the receiving antenna 75 are electromagnetically shielded by the electromagnetic shielding cover 72 and the electromagnetic shielding cover 73.

Figure 17:
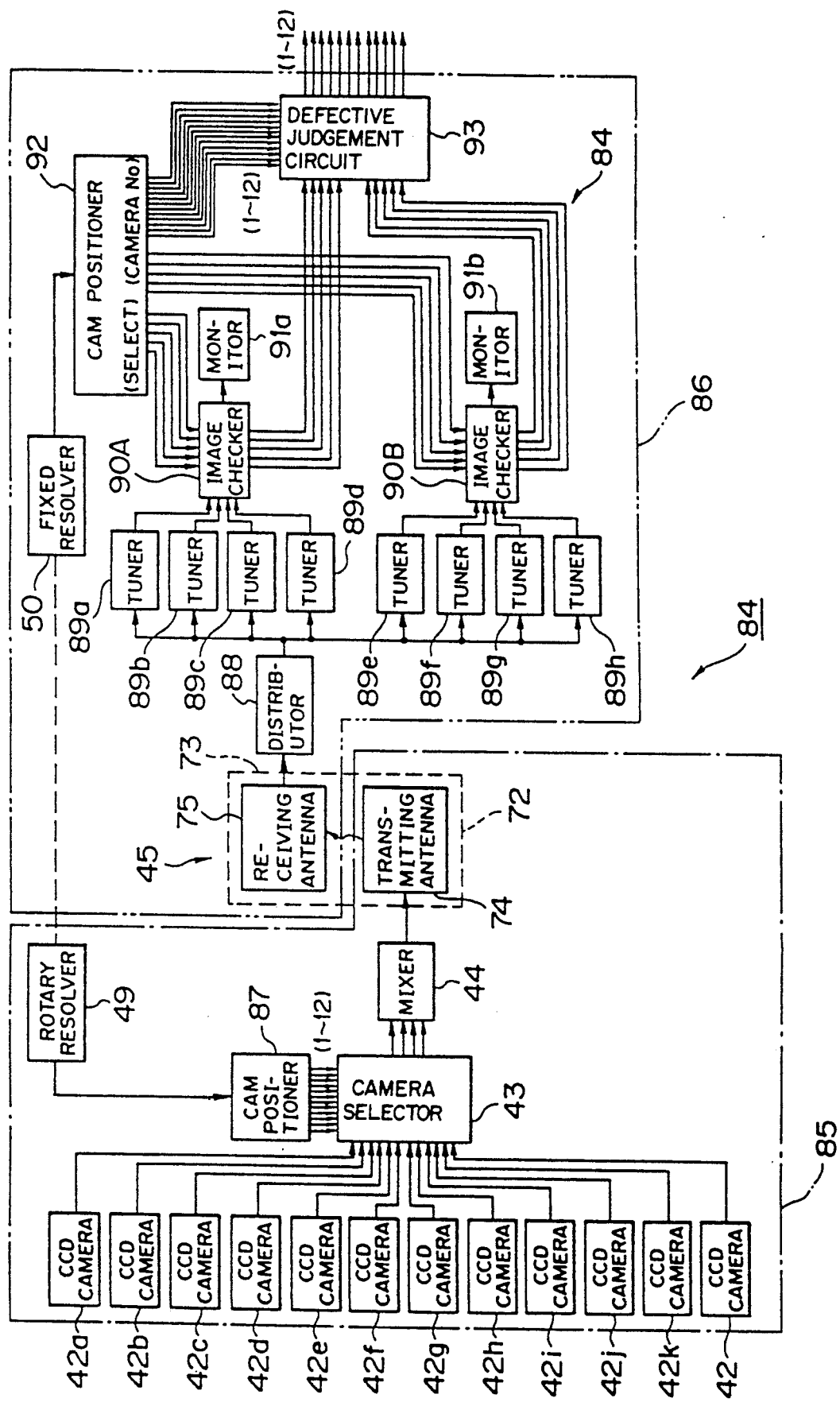
FIGS. 17 and 18 are block diagrams showing a signal processing according to this invention.

In FIG. 17, the frequency band of the mixed image information received by the receiving antenna 75 is distributed by the distributor 88. The information thus distributed are delivered to respective tuners 89a to 89d, at which information signals are detected. The information signals from the tuners 89a to 89d of the respective tuners 89a to 89h are delivered to the image checker 90A. Further, information signals from the tuners 89e to 89h are delivered to the image checker 90B for processing image information. These image checkers 90A and 90B are monitored by monitors (CRT) 91a and 91b. A cam positioner 87 connected to the rotary resolver 49 discriminates a detected angular position of the rotary inspection table 12, and a cam positioner 92 connected to the fixed resolver 50 specifies the numbers of cameras to transmit specified results to a defective judgement circuit 93. In addition, the cam positioner 92 generates a select signal to either the image checker 90A or the image checker 90B to allow it to select a control pattern of the image checker.

Figure 18:
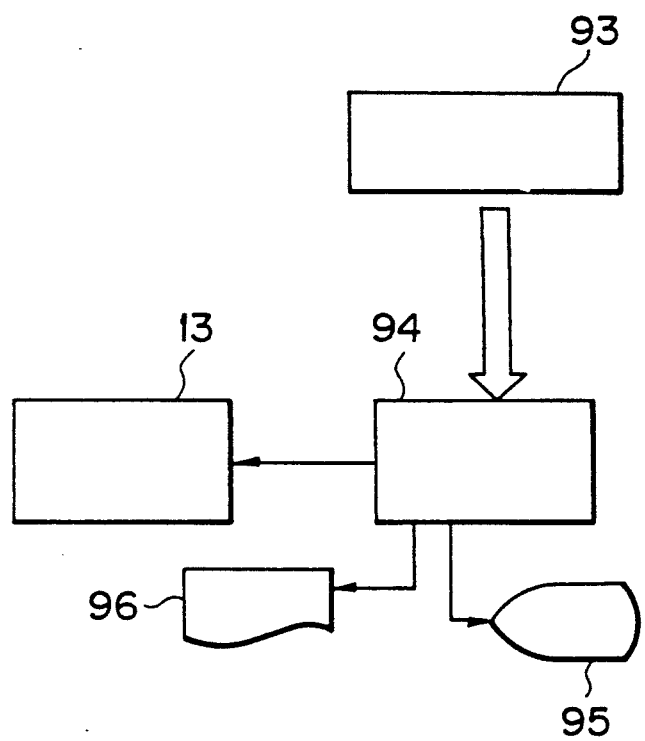

The defective judgment circuit 93 judges whether or not the article to be inspected is defective on the basis of image information signals from respective cameras to output a defective detection signal or signals to a microcomputer 94 (FIG. 18). In this case, discrimination between a good article and a defective article is carried out, for example, by using a method of binarizing image information signals on the bais of brightness to count the number of pixels at the dark portion. The defective detection signal includes information for specifying which article or articles are defective. The microcomputer 94 generates a command at the time point when this defective article reachs the position of the star wheel functioning as the defective article ejection member, thus to reject this defective article. On the other hand, the microcomputer 94 processes a defective detection signal to output the processed result to a CRT 95 or a printer 96, thus to carry out image display or a printing thereof.

In this embodiment, there are provided eight tuners wherein one image checker shares four tuners. Namely, respective image checkers can process different four frequency bands. Thus, the image checkers carry out switching between frequency bands to be processed so that respective signal processing of these frequency bands do not overlap with each other to carry out signal processing.

To realize this, twelve CCD cameras are divided into four groups. Namely, as seen from FIG. 20, the CCD camera 1 (42a), the CCD camera 5 (42b) and the CCD camera 9 (42c) are assumed as a first group; the CCD camera 2 (42d), the CCD camera 6 (42e) and the CCD camera 10 (42f) are assumed as a second group; and the CCD camera 3 (42g), the CCD camera 7 (42h) and the CCD camera 11 (42i) are assumed as a third group; and the CCD camera 4 (42j), the CCD camera 8 (42k) and the CCD camera 12 (42l) are assumed as a fourth group.

Figure 21:
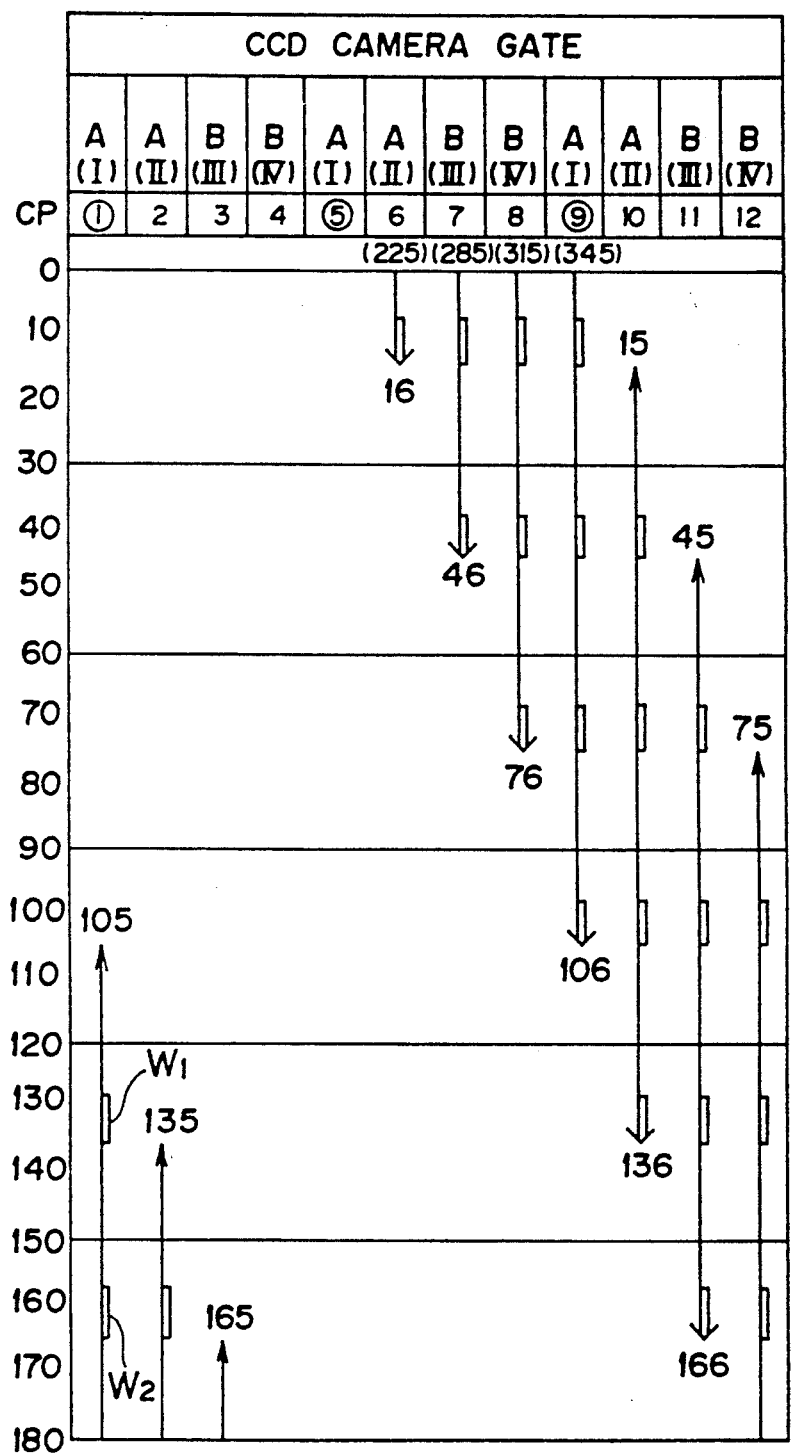
FIGS. 21 and 22 are explanatory views of the operating states of CCD cameras of the tube inspecting machine.
Figure 22:
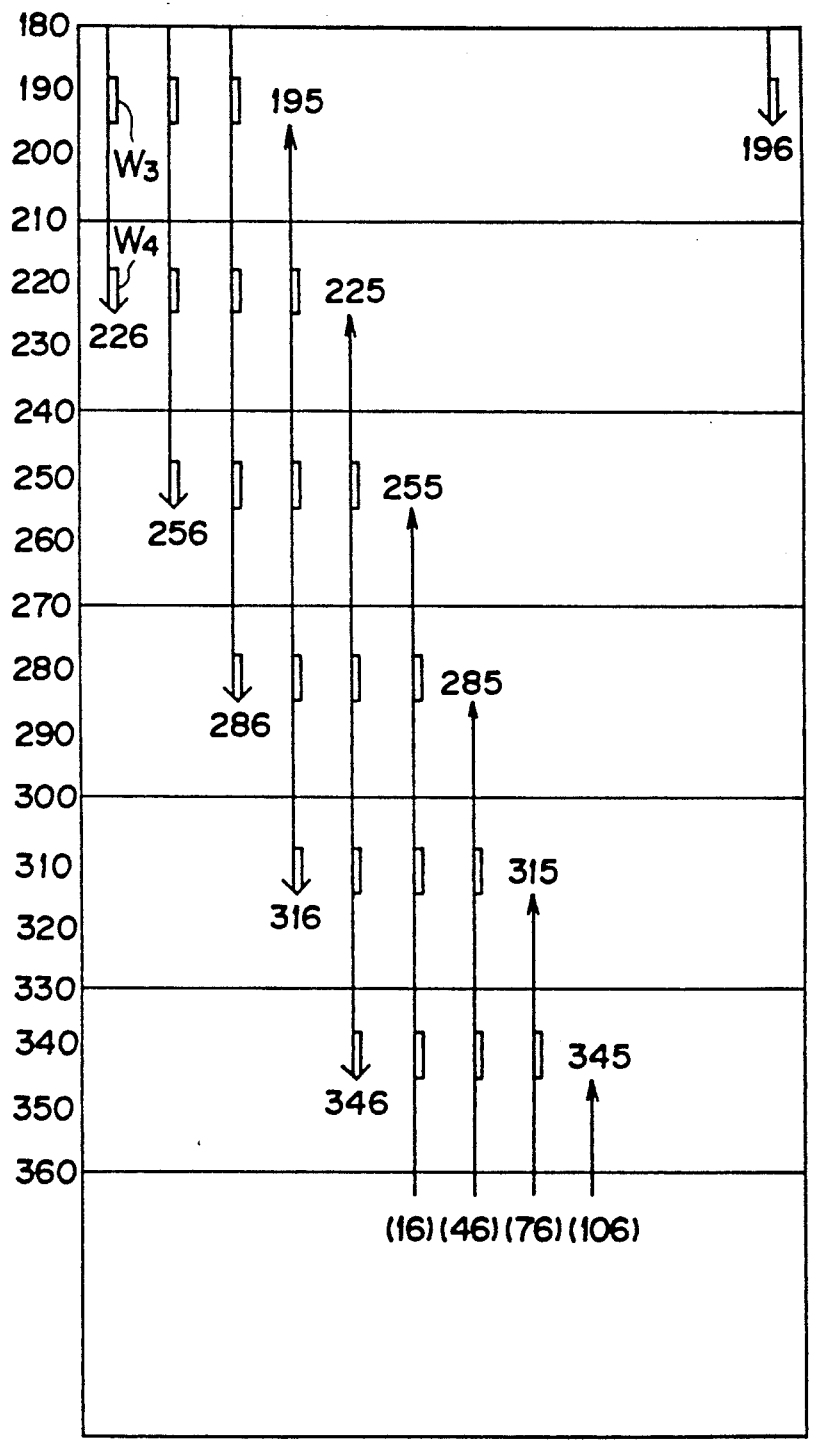

By the position detection by the rotary resolver 49 for monitoring rotation of the rotary inspection table 2 and the fixed resolver 50 on the fixed side, which camera outputs a signal being processed is judged. FIGS. 21 and 22 show the relationship between the CCD camera gate and the rotational position of the rotary section.

Figures 20A, 20B:
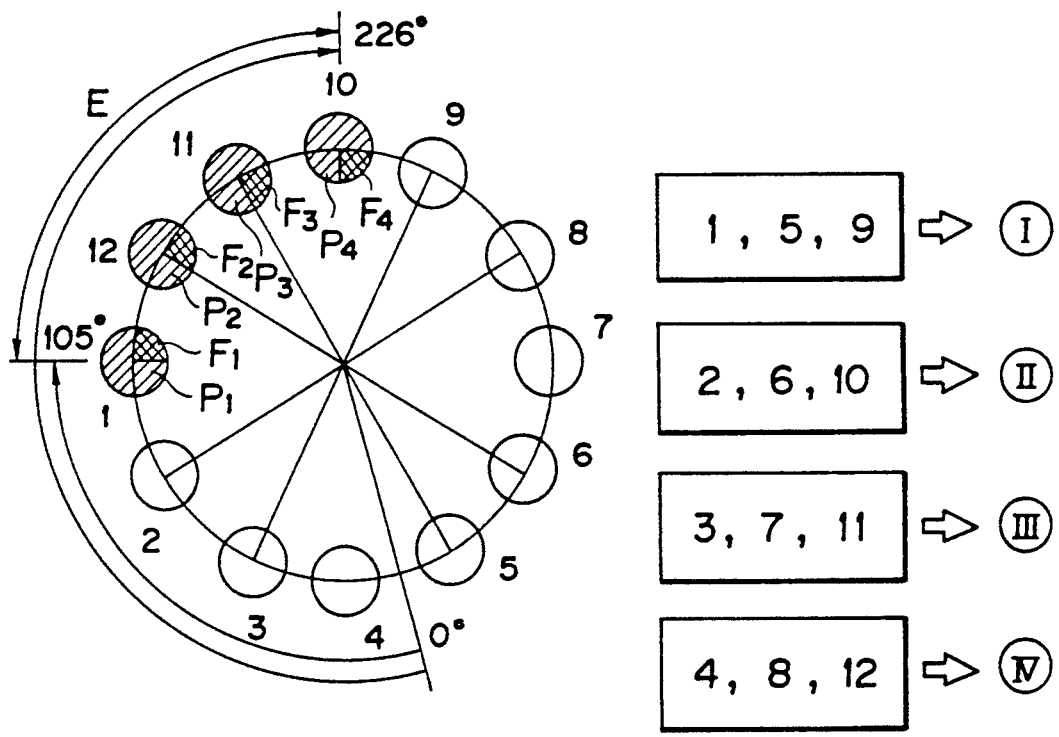
FIGS. 20A and 20B are explanatory views of the inspecting state by the tube inspecting machine.

According to FIG. 20A, when the reference position 0 degree is assumed to be positioned between the CCD camera 4 (42j) and the CCD camera 5 (42b), the rotary block is rotated in a direction as indicated by an arrow in FIG. 20(A). As previously described, inspection of the internal bottom surface is carried out in connection with the portion indicated by slanting lines in the figure during that rotational period. It is now assumed that the CCD camera 1 (42a) enters the inspection region E to come to the position of 1. This position is located at the position spaced by 105 degrees with respect to the reference position. A signal at that position is delivered from the rotary resolver 49 to the cam positioner 92 to open the CCD camera gate. The camera gate is opened from the gate position of 105 degrees to the position of 226 degrees to take in images from the CCD camera 1 (42a) at timings indicated by lines W1, W2, W3 and W4. When the CCD camera 1 (42a) has completed the internal surface inspection in this way, the CCD camera 5 (42b) enters the position of 1 of the internal inspection region E. Further, in the range from an angle of 225 degrees to 346 degrees, the gate is independently opened four times to send a signal of an image in the CCD camera 5 (42b) to the camera selector 43. Similarly, a CCD gate for the CCD camera 9 (42c) becomes active to send a signal of the CCD camera 9 (42c).

By such a method, the operation for taking in signals from the CCD cameras is similarly carried out also in connection with other three camera groups.

Namely, at a certain cam position, a detection signal of one camera selected from the respective camera groups is taken in. Respective detection signals thus obtained are detected by the respective tuners. At one image checker, image information are inputted from two tuners at the same time. Respective image checkers process two detection signals in succession to judge whether or not an article to be inspected is defective. Reference symbols A and B in FIG. 21 represent image checkers, and I, II to IV represent group names. Namely, the image checker 90A takes charge of the groups I and II, and the image checkers 90B takes charge of the groups III and IV. The numeric value in a longitudinal direction represents a camera position, and the numeric value in a lateral direction represents a camera number.

Figure 23:
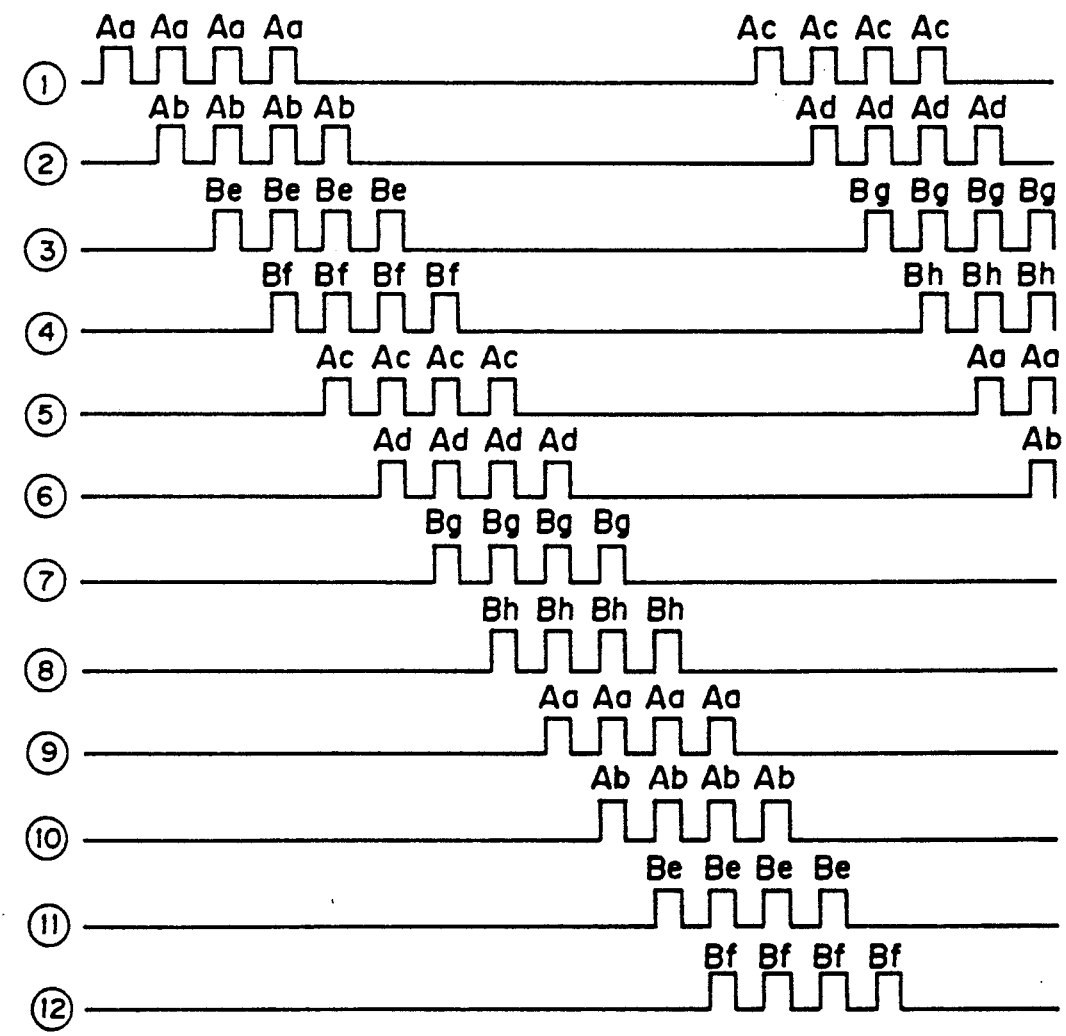
FIG. 23 is an explanatory view of the operation of image checkers corresponding to the respective CCDs.

FIG. 23 shows how signals are taken in at this time. In FIG. 23, A and B represent image checkers, and a, b ... h represent tuners. The numeric value in a longitudinal direction represents a camera position and the lateral direction represents a cam position. Namely, the camera of the camera No. 1 is processed by the tuner 89a of the image checker 90A at the beginning. At this time, the camera of the camera No. 2 is processed by the tuner 89b of the image checker 90A. The camera of the camera No. 3 is processed by the tuner 89e of the image checker 90B, and the camera of the camera No. 4 is processed by the tuner 89f of the image checker 90B. When the cameras of &he camera Nos. 1 and 2 make one revolution to next reach the inspection position, they are processed by the tuners 89c and 89d of the image checkers 90A, respectively. Further, when the cameras of the camera Nos. 3 and 4 make one revolution to next reach the inspection position, they are processed by the tuners 89g and 89h of the image checker 90B, respectively.

FIG. 24 is a Table showing the operating state of the CCD cameras and the image checkers. Since there are provided twelve cameras, there exist twelve kinds of patterns (1 to 12) which are in ON state at the inspection position. Namely, there are twelve forms of cameras 1, 12, 11, 10; 2, 1, 12, 11, . . . On the contrary, there exist eight tuners. The image checkers 90A and 90B are respectively provided with four tuners, and there exist eight forms (A,B . . . H) where the image checkers 90A and 90B take in two detection information having different frequencies to be processed. Accordingly, when the least common denominator of these forms is taken, it is seen that two revolution cycles of the camera and three cycles of the fixed block pattern correspond to each other. Namely, in order to allow two rotations (720 degrees) of the rotary resolver 49 and one rotation (360 degrees) of the fixed resolver 50 to correspond to each other, the rotational angles of the rotary resolver 49 and the fixed resolver 50 have the relationship of a ratio of 2:1. Thus, in the case where the angular position of the fixed resolver is 60 degrees, the operation of the pattern E is carried out. As a result, a corresponding select signal is sent from the cam positioner 92 to the image checkers 90A and 90B.

The reason why the operations of the CCD cameras and the controller are controlled in this way is to prevent that three signals or more of different frequencies are simultaneously inputted to the same image checker, whereby respective processing by the image checkers fail to follow the rotational speed of the cameras.

FIGS. 25 and 26 show a processing state (judgement output state) of detection information with respect to cam positions of the image checkers 90A and 90B wherein the cam position is indicated at the left end of the figure, and the left side inside the figure represents image taken-in positions by the image checkers 90A and 90B. In these figures, for example, while the angular position of the rotary resolver 49 is in the range of 129 to 136 degrees, the both image checkers 90A and 90B take in images. At the angular position of the rotary resolver 49 from 136 to 240 degrees or more, the judgement operation of the image checker is carried out in connection with signals taken in from the tuner 89a.

Figure 27:
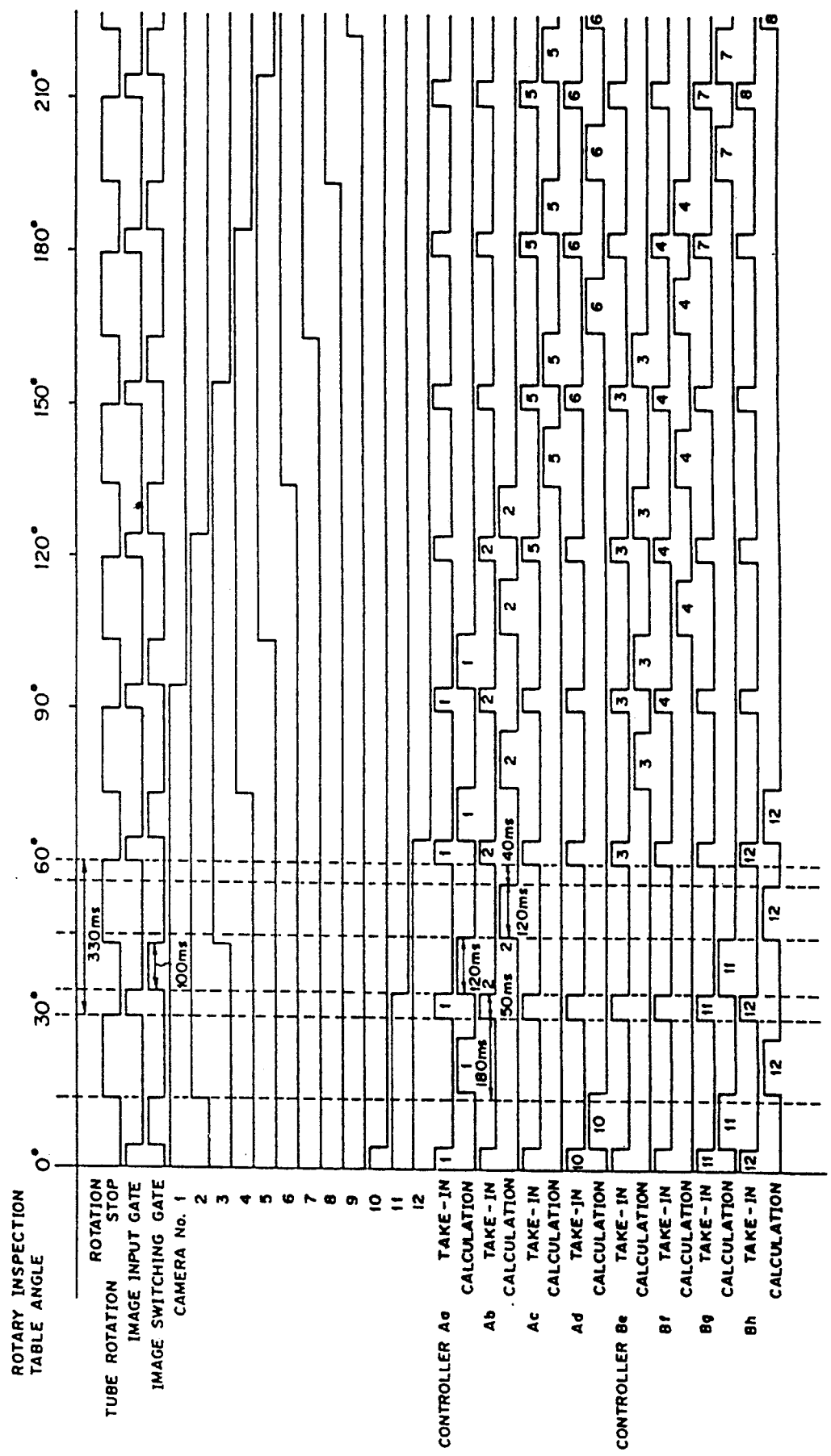
FIG. 27 is an explanatory view of the operation of a signal processor.

These control operations are shown in a collective form in FIG. 27.

Namely, the tube T rotates in front of the allocation position of 30, 60, 360 degrees of the cam positions. At the respective allocation positions, the image input gate is opened, and the image switching gate is then opened, whereby switching to a new image is carried out. Thus, CCD cameras are in succession turned ON to enter the inspection state. The image checkers 90A and 90B take in signals from all the tuners as image information when the image input gate is opened. At this time, the image checker 90A takes charge of two informations selected from four cameras which are in ON state, and the image checker 90B takes charge of the other two informations. For example, at the cam position of 0 degree, inspection information from the cameras 1 and 10 are taken in the tuners 89a and 89d with respect to the image checker 90A, and inspection information from the cameras 11 and 12 are taken in the tuner 89g and 89h with respect to the image checker 90B. Then, at the image checker 90A, inspection information from the camera 1 is first subjected to computational processing.

Thereafter, while the image switching gate is opened, switching to computational processing for inspection information of the camera 2 is carried out. Similarly, the image checker 90B also performs computational processing of inspection information.

Another embodiment relating to the processing of inspection information will now be described.

Figure 28:
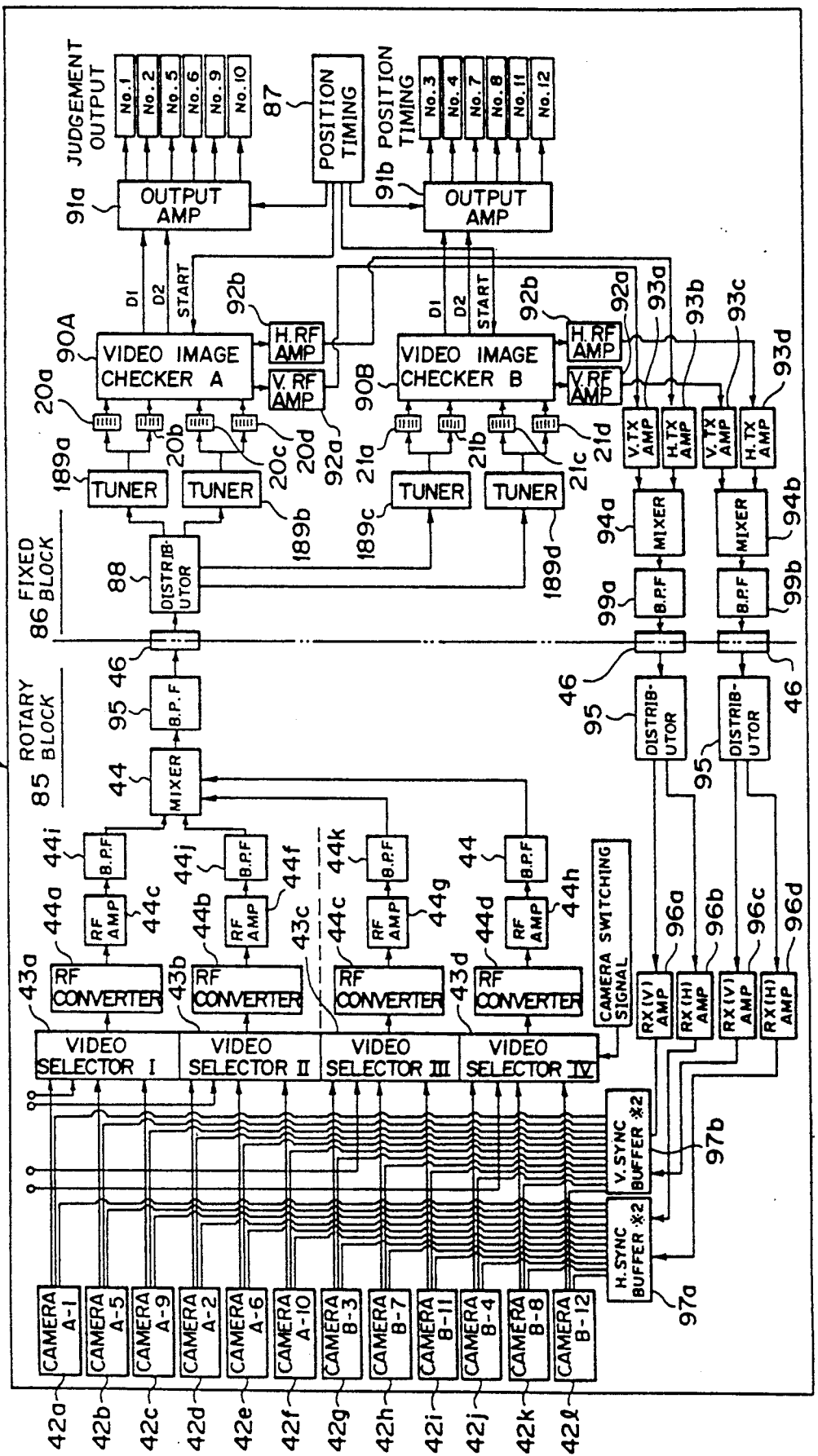
FIG. 28 is a block diagram showing another embodiment of a signal processor according to this invention.

In FIG. 28, the signal processing device 84 roughly comprises a rotary block 85 and fixed block 86. The rotary block 85 includes twelve CCD cameras 42a to 42l, and VIDEO selectors 43a, 43b, 43c and 43d to sort twelve CCD cameras into four groups every three cameras to select one of three cameras to select that image information. Image information selected by the VIDEO selectors 43a, 43b, 43c and 43d are converted by an RF converter. These information thus obtained are amplified by RF amplifiers 44e, 44f, 44g and 44h. The signals amplified by the RF amplifiers 44e, 44f, 44g and 44h are passed through band pass filters 44i, 44j, 44k and 44l. Thereafter, these signals are sent to a mixer 44 for mixing signals selected by the four VIDEO selectors 43a, 43b, 43c and 43d. A signal outputted from the mixer 44 is sent to the antenna unit 46 through the BPF 95.

Image information of the internal bottom surface of the laminate tube T from the respective CCD cameras 42a to 42l are processed as follows. Namely, when the cam positioner 87 (FIG. 17) receives an angular position of the rotary inspection table 12 detected by the rotary resolver 49, the VIDEO selector 43 specifies a camera which is to take information thereinto. Thus, image information from that CCD camera is selected and taken in. The image information thus obtained are transmitted to the mixer 44. As apparent from FIG. 15, since when a certain laminate tube T reaches the point P4, succeeding laminate tubes T have already reached the positions P3, P2 and P1, image information from four cameras are taken in at the same time. The mixer 44 respectively demodulates four image information at predetermined carrier waves to mix them, thus to output a mixed signal to the transmitting antenna 46 through the BPF 95.

The image signal is delivered to the distributer 88 via the antenna unit 46.

Figure 29:
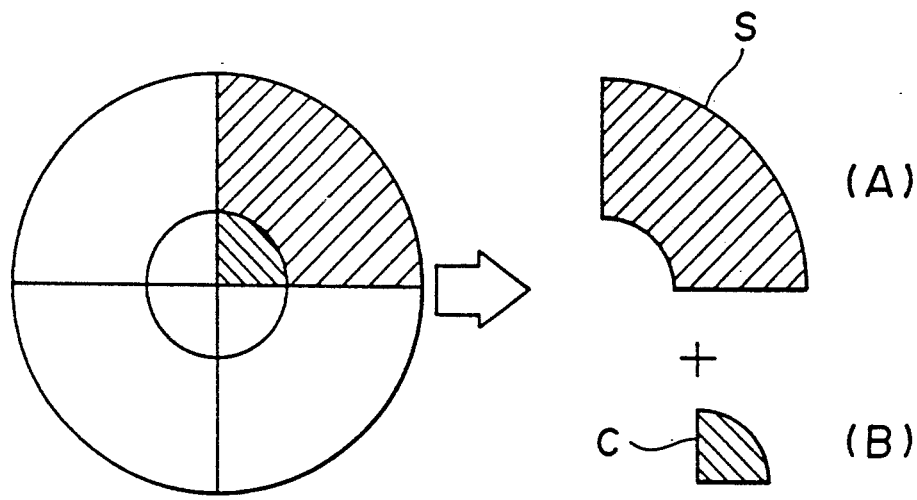
FIGS. 29A and 29B are divisional diagrams showing inspection of divided inspection regions.
Figure 30:
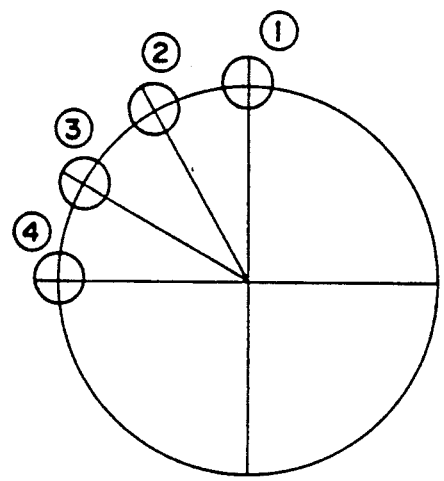
FIG. 30 is an explanatory view showing divisional processing of the inspection region at respective inspecting positions.

The fixed block 86 includes a distributor 88 for distributing received image information into four tuners, 189a, 189b, 189c and 189d corresponding to frequencies converted by the previously described four RF converters 44a, 44b, 44c and 44d, and memory sections 20a, 20b, 20c, 20d, 21a, 21b, 21c and 21d for recording images reproduced at the above mentioned four tuners 89a, 89b, 89c and 89d. Two memory sections are provided with respect to one tuner because the bottom surface S of the tube and the squeezing opening C are separately processed a shown in FIGS. 29 and 30.

Then, image data stored in the memory sections 20a, 20b, 20c and 20d are transmitted to the video image checkers 90A and 90B for processing such image data. Data processed at the video image checkers 90A and 90B are outputted as judgement outputs through output amplifiers 91a and 91b. At this time, a start signal is outputted from the cam positioner 87 to the video image checkers 90A and 90B and the output amplifiers 91a and 91b. By this start signal, the signal output timing is provided.

On the other hand, horizontal and vertical synchronizing signals are outputted from the video image checkers 90A and 90B. and are amplified by signal amplifiers 92a and 92b, respectively. Then, signals from the signal amplifiers 92a and 92b are transmitted to respective amplifiers 93a, 93b, 93c and 93d, and amplified thereat. Thereafter, signals from the amplifiers 93a, 93b, 93c and 93d are mixed at mixers 94a and 94b. The mixed signal thus obtained is sent to the rotary block 85 through the BPFs 99a and 99b and the antenna section 46. A signal received by the antenna unit of the rotary block 85 is distributed into two sets of amplifiers on the receiving side by the distributor 95. Signals outputted from the amplifiers AMP 96a, 96b, 96c and 96d are sent to the CCD cameras 42a to 42l through buffers 97a and 97b. At this time, the synchronizing signals are distributed so that the respective video checkers corresponds to the respective cameras taken in charge of the respective video checks. These synchronizing signals are transmitted together with images from the CCD cameras. Thus, those images are discriminated in accordance with the synchronizing signals.

On the other hand, at the video image checker 90A, image information to be processed is binarized. As a result, if any foreign material, flaw or contaminant, etc. is not found, an OK signal is outputted to the amplifiers 91a and 91b, while if any foreign material, flaw or contaminant is found, an NG signal is outputted thereto. The amplified signals are outputted as judgement outputs from those amplifiers.

The antenna structure used for the control device of FIG. 28 will now be described.

Figure 31A:
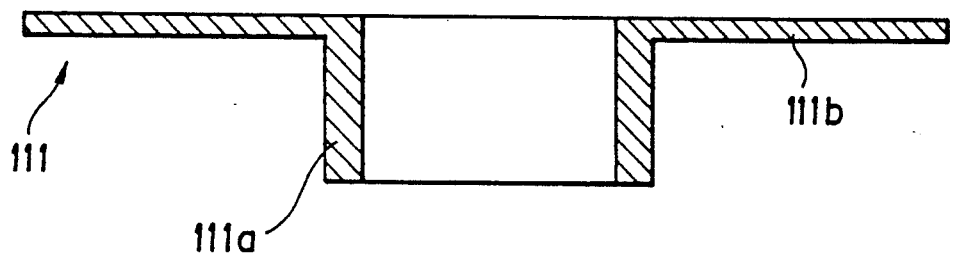
FIGS. 31A, 31B and 31C are cross sectional views of an antenna of this invention.
Figure 31B:
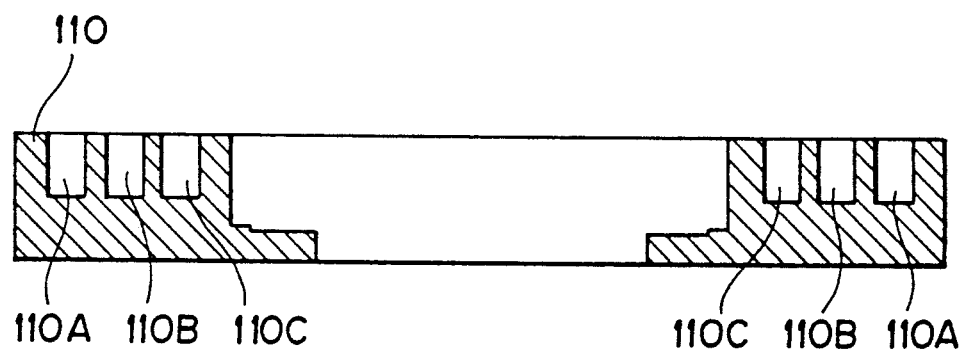
Figure 31C:
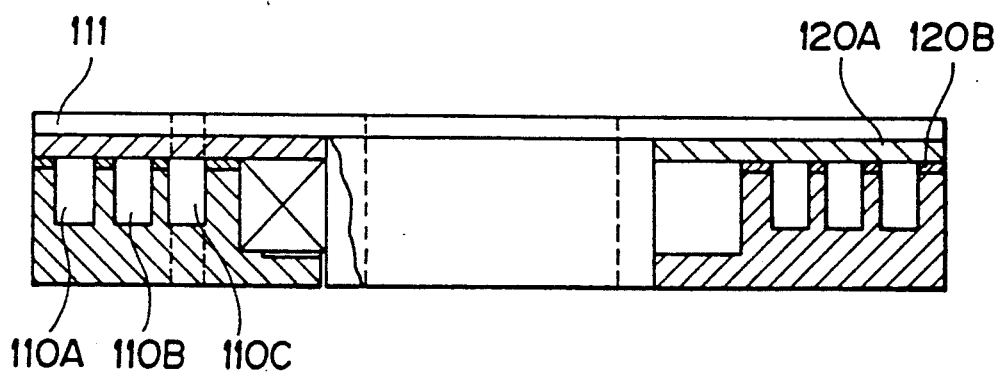
Figure 32:
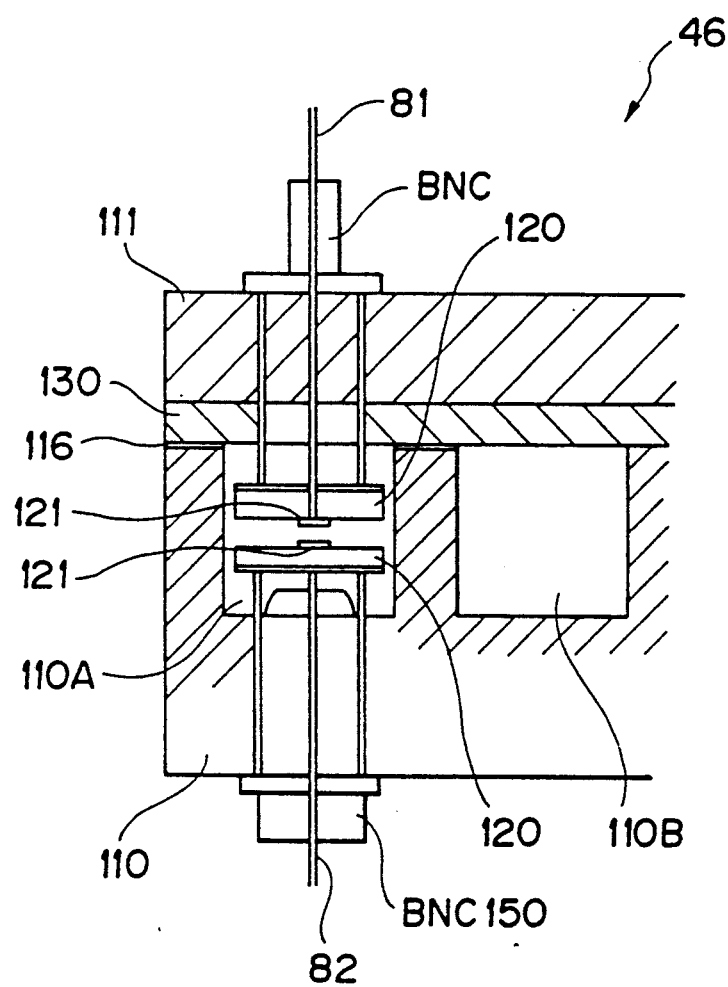
FIG. 32 is an enlarged view showing the essential part of the antenna of this invention.
Figure 33A:
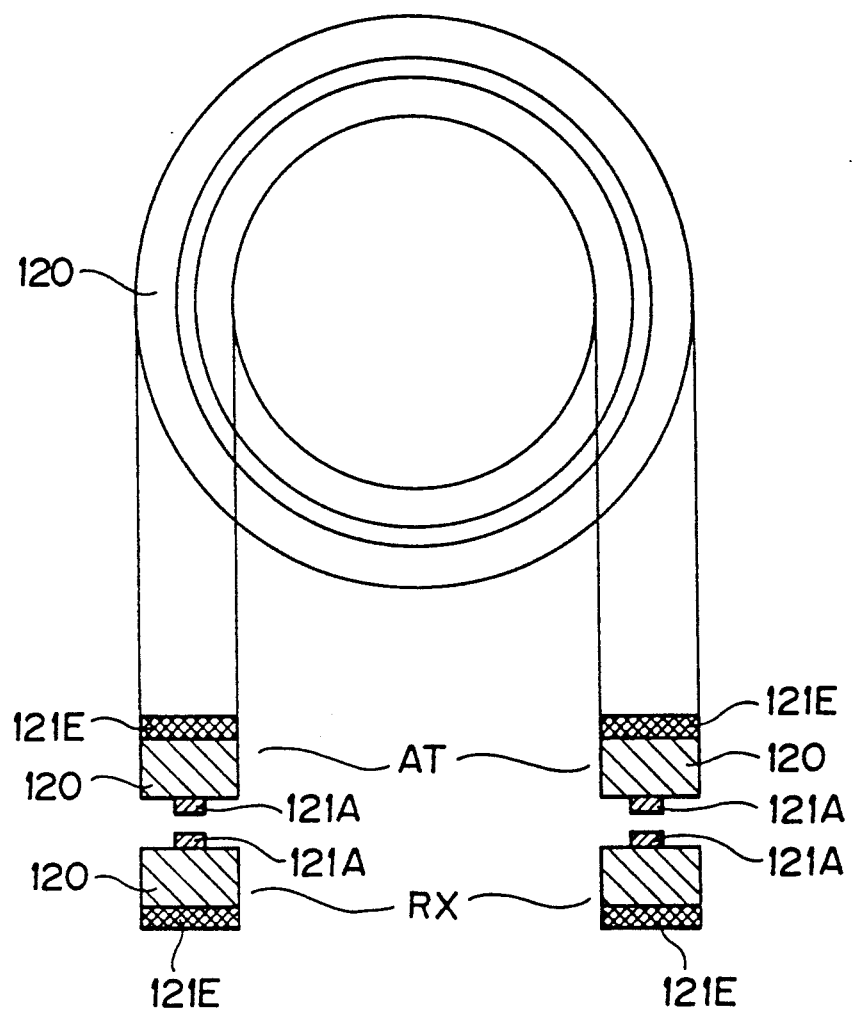
FIG. 33A is a cross sectional view of an antenna of this invention.
Figure 33B:
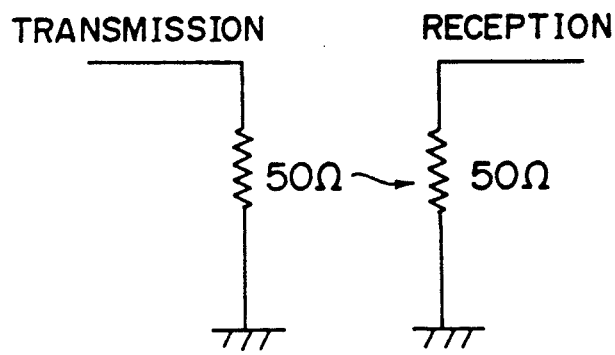
FIG. 33B is an equivalent circuit view of the antenna of this invention.
Figure 34:
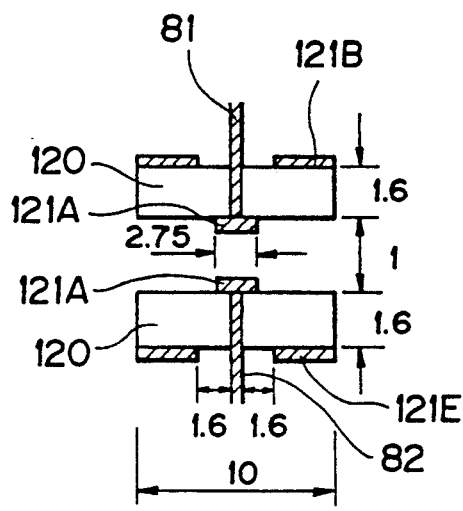
FIG. 34 is an enlarged dimensional view showing the essential part of the antenna of this invention.
Figure 35:
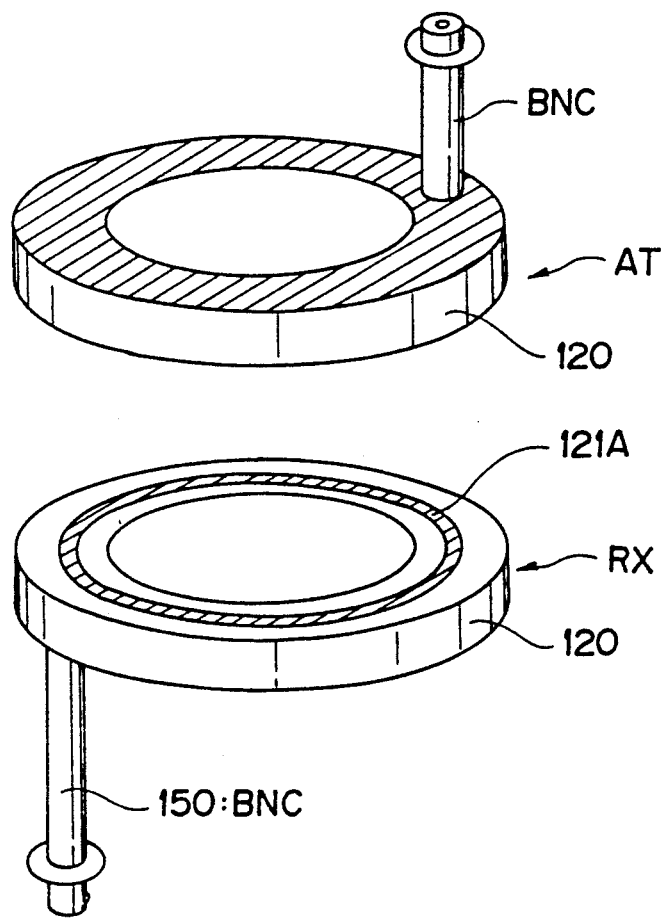
FIG. 35 is a perspective view of the antenna of this invention.

Referring to FIG. 31, the antenna unit 46 is composed of a fixed section 110 and a rotary section 111. The rotary section 111 includes a hollow cylindrical portion 111a and a disk portion 111b. The fixed section 110 includes three concentric grooves 110A, 110B and 110C. The fixed section 110 and the rotary section 111 overlap with each other to form a single antenna. The groove 110A is used as an antenna for transmitting an image signal, and the grooves 110B and 110C are used as antenna sections for transmitting horizontal and vertical synchronizing signals from the image checkers 90A and 90B to the CCD cameras, respectively. Explanation will be given by taking an example of an antenna in the groove 110A formed within the fixed section 110. As best seen from FIGS. 32 to 35, coating films 121 of copper are attached to the both sides of a printed board 120 formed of glass epoxy resin. By etching process, a circular printed board is prepared. An elongated belt-shaped portion 12A is formed on one side of each printed board 120 so as to function as an antenna, and a copper coating film portion 121E is formed on the other side thereof so as to function as an earth. In this instance, in order to take matching between impedance of the antenna on the transmitting side and that on the receiving side, the thickness of the printed board 120 formed on glass epoxy resin is set to 1.6 mm, the width of the antenna portion on the printed board is set to 2.75 mm, the distance between the antenna portion AT and the receiving side antenna RX is set to 1 mm, the distance between the earth portion 121E and lead wires 81, 82 is set to 1.6 mm, and these values are the same in connection with the transmitting antenna AT and the receiving antenna RX. Thus, even when viewed from either the transmitting antenna AT or the receiving antenna RX, the impedance becomes equal to 50 ohms, thus making it possible to obtain matching between impedance values (see FIG. 33(B)). For this reason, no standing wave ratio (SWR) is generated, thus making it possible to transmit and receive a signal free from noise. As can be understood from FIG. 33, the antenna portions 121A, 121A of the transmitting side antenna AT and the receiving side antenna RX are in a stripe form, and the entire surface of the earth portion 121E is covered with coating film of copper. The NBC connector can be used as a connector (FIG. 35).

Further, a slide portion 130 formed of carbon tool steel is provided between the fixed block and the rotary block.

Figure 36:
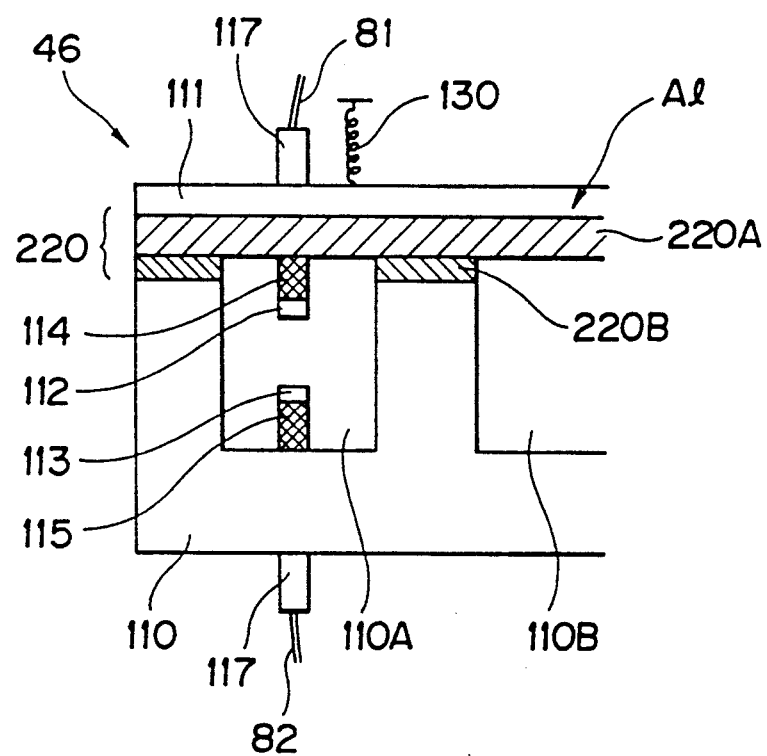
FIG. 36 is a cross sectional view showing another embodiment of an antenna.

FIG. 36 shows another embodiment of the antenna. Explanation will be given by taking an example of the structure in the groove 11A formed within the fixed block 110. Antenna portions 112 and 113 are connected to insulators 114 and 115. Further, these antenna portions 112 and 113 are connected to an external unit by way of lead wires 81 and 82. The antenna portions 112 and 113 input and output signals through a BNC connector 117 and the lead wires 81 and 82. Similarly other two grooves 110B and 110C are formed. The fixed section is formed of Al (aluminum), etc. in order to carry out electromagnetic shielding. A slide contact portion 220 is comprised of a slide portion 220A formed of conductive resin: conductive nylon material (e.g.,-conductive MC nylon (Nippon polypenco Kabushiki Kaisha), and a slide portion 220B formed of a steel plate, provided below the rotary section 111. Further, above the rotary section 111, there is provided an elastic member 130 pushing the rotary section 111 onto the fixed section 110 to allow the rotary section 111 and the fixed section 110 to be tightly in contact with each other, thus to improve shielding property. Thus, when the rotary section 111 rotates, the fixed section 110 and the rotary section 111 are in slide-contact with each other. Thus, satisfactory shielding property is maintained.

It is to be noted that this invention is not limited to the above described embodiments. While, in the above described embodiments, the laminate tube T as a tubular body intermittently revolves about its axis through the holder H, and the CCD camera 42 itself is fixed on the rotary block, there may be employed a reciprocal arrangement such that the CCD camera 42 itself intermittently revolves about its axis without revolving about its axis. It is to be noted that, in this case, it is required to provide, every camera, transmitting/receiving antennas (e.g., small size antenna portion 46) for transmitting and receiving image signals from the CCD cameras 42 between the rotating camera side and the rotary block side as the fixed side with respect to the camera. Further, the movement of the CCD camera 42 is not limited to rotational movement (revolution about its axis). If the entire internal bottom surface can be inspected, other of movement such as jigzag movement, etc. may be employed.

Further, while, in this embodiment, the laminate tube T is intermittently revolved about its axis to inspect the quality of an article by an image at a staionary time, an approach may be employed to successively rotate the laminate tube T to take image information into the control device, thus to carry out processing/discrimination. For the same reason as stated above, the movement of the tube T may be jigzag movement in place of revolution about it axis.

In the above described embodiments, the laminate tube T also makes an orbital movement. The reason why such a movement is employed is to make it possible to install the inspection machine in a small space in the middle of a manufacturing line. However, the movement is not necessarily limited to the orbital movement. For example, if the laminate tube T intermittently revolves about its axis while moving in one direction to permit a camera to be inserted thereinto, a linear movement may be employed.

Figure 7B:
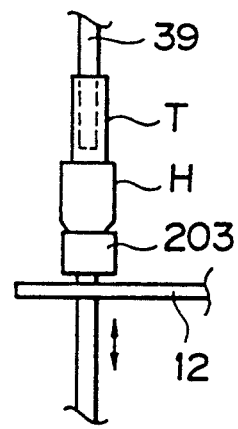
FIG. 7B is an explanatory view showing another embodiment of the operation for inserting the tube inside inspection device into a tube.

Furthermore, while, in this embodiment, the laminate tube T is rotated in a horizontal direction while moving upward and downward the tube inside inspection device to allow it to be inserted into the laminate tube T, the laminate tube T may be moved upward and downward together with the holder to allow the tube inside inspection device to be inserted into the laminate tube T (FIG. 7B).

In addition, while, in the above described embodiments, explanation has been given in connection with a laminate tube T which is a tubular body such that the bottom portion of the tubular body is squeezed so as to take a tapered structure and a take-out opening is provided at a portion of the sqeezed portion, this invention is applicable to a tubular body with a bottom portion such as a bottle or a can one end of which is closed.

What is claimed is:

1. A tubular body inspection system comprising:
   a carrying path in a loop form;
   carrying means moving on said carrying path and capable of carrying a tubular body to be inspected;
   transfer means provided at a position in the vicinity of said carrying path to transfer said tubular body to be inspected from outside onto said carrying means;
   inspection means positioned one downstream side of said transfer means in the vicinity of said carrying path so as to be inserted into the tubular body to be inspected while moving together with said carried tubular body to be inspected to pick up an image of the internal surface of said tubular body to output a video signal thereof;
   transmission means for taking out the video signal from said inspection means in a non-contact manner to transmit it;
   image processing means to receive the transmitted video signal to discriminate a state of the internal surface of said tubular body to be inspected on the basis of the video signal whereby when said image processing means detects a defective article, it outputs a defective detection signal for specifying the defective article; defective article rejection means positioned on downstream side of said inspection means in the vicinity of said carrying path to reject a corresponding defective article from said carrying mean in accordance with the defective detection signal; and
   take-out means positioned on downstream side of the defective article rejection means in the vicinity of the carrying path for taking out said carried tubular body to be inspected from said carrying means to discharge it.

2. A tubular body inspection apparatus comprising:
   carrying means for carrying a tubular body having a bottom surface on its one end;
   image pick up means carried in association with said tubular body so as to be inserted into said tubular body to pick up an image of an internal surface of said tubular body to output a video signal;
   transmission wave formation means for forming a transmission wave for transmitting a video signal from said image pick up means;
   signal transmission and reception means for transmitting the video signal in a non-contact state; and image processing means for processing the video signal transmitted through said signal transmission and reception means to discriminate a state of the internal surface of said tubular body.

3. A tubular internal surface inspection apparatus as set forth in claim 2, wherein said image pick up means carries out, with respect to an entire side wall surface and a bottom surface of said tubular body, an operation for picking up images of a side wall surface and bottom portion in a visual field determined in a state wherein said image pick up means is directed to the side wall surface and the bottom surface of said tubular body and is arranged close to said side wall surface and said bottom surface.

4. A tubular internal surface inspection apparatus as set forth in claim 2, wherein said image pick up means is inserted into said tubular body by moving either said tubular body or said image pick up means.

5. A tubular body internal surface inspection apparatus as set forth in claim 2, wherein said image processing means includes memory means for storing an image divided into a plurality of segments in order to carry out processing, in a divided form, an image picked up by said image pick up means, and judgement means for binarizing the image stored by said memory means to judge the data.

6. A tubular body internal surface inspection apparatus as set forth in claim 2, wherein said transmission wave formation means includes a selector for grouping a plurality of image pick up means for picking up an image of a tubular body mounted on said rotary inspection table into a plurality of blocks to select signal take-out cameras in respective groups, and a converter for outputting in succession video signals of the cameras selected by said selector to carry out a frequency conversion.

7. A tubular body internal surface inspection apparatus as set forth in claim 2, wherein said image pick up means is composed of twelve CCD cameras, images from said CCD cameras being selected one by one by four VIDEO selectors.

8. A tubular body internal surface inspection apparatus as set forth in claim 2, wherein said image processing means comprises reproducing means for reproducing, in correspondence with a plurality of frequencies on a transmitting side, a signal obtained by applying frequency convertion to a signal of an image of the internal surface of said tubular body picked up by said image pick up means rotational angle information generation means for a rotary block, and judgement means for judging which image pick up means provides an image reproduced by said reproducing means.

9. A tubular body internal surface inspection apparatus as set forth in claim 2, wherein said image processing means includes a video image checker for carrying out image processing, horizontal and vertical synchronizing signals from said video image checker being taken out to transmit them to the image pick up means corresponding to said video image checker through the signal transmission and reception means.

10. A tubular internal surface inspection apparatus as set forth in claim 2, wherein said image pick up means carries out, with respect to an entire internal surface of said tubular body, an operation for picking up an image of an internal bottom surface portion in a visual field determined in a state wherein said image pick up means is directed to the internal surface of said tubular body and is arranged close to said internal bottom surface.

11. A tubular body internal surface inspection apparatus as set forth in claim 10, wherein said image pick up means picks up an image of said internal bottom surface while holding a state wherein said image pick up means is arranged close to said internal bottom surface, and while relatively carrying out planar movement between said image pick up means and said tubular body.

12. A tubular body internal surface inspection apparatus as set forth in claim 2, wherein said carrying means is composed of a rotary inspection table, one end of said body to be inspected being mounted on said rotary inspection table while holding it by a first holding member, a second holding member for holding the other end of said body held by said first holding member arranged on said rotary inspection table, said image pick up means being inserted from the other end of said body held by said first and second holding members.

13. A tubular body internal surface inspection apparatus as set forth in claim 12, wherein said first holding member is mounted on a rotary seat attached to said rotary inspection table, said rotary seat being formed on an upper surface of a rotational body which intermittently rotates by a predetermined angle in accordance with rotation of said rotary inspection table, a centering shaft movable upward and downward being provided within said rotational body, an upper portion of said centering shaft being inserted into said first holding member to carry out centering of said first holding member.

* * * * *